United States Patent
Siomina et al.

(10) Patent No.: US 8,929,826 B2
(45) Date of Patent: Jan. 6, 2015

(54) METHOD AND NODE FOR REDUCED TRANSMISSION ACTIVITY PATTERN CONFIGURATION

(75) Inventors: Iana Siomina, Solna (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 669 days.

(21) Appl. No.: 13/147,200

(22) PCT Filed: Jun. 23, 2011

(86) PCT No.: PCT/SE2011/050831
§ 371 (c)(1),
(2), (4) Date: Aug. 17, 2011

(87) PCT Pub. No.: WO2012/023894
PCT Pub. Date: Feb. 23, 2012

(65) Prior Publication Data
US 2012/0046030 A1    Feb. 23, 2012

Related U.S. Application Data

(60) Provisional application No. 61/375,531, filed on Aug. 20, 2010.

(51) Int. Cl.
| | |
|---|---|
| H04W 4/00 | (2009.01) |
| H04W 24/00 | (2009.01) |
| H04W 40/00 | (2009.01) |
| H04B 17/00 | (2006.01) |
| H01Q 3/00 | (2006.01) |
| H04B 1/00 | (2006.01) |
| G01S 5/00 | (2006.01) |
| H04W 72/12 | (2009.01) |

(52) U.S. Cl.
CPC .............. *G01S 5/00* (2013.01); *H04W 72/1226* (2013.01)
USPC ....... 455/63.1; 455/423; 455/67.11; 455/446; 455/422.1; 342/360

(58) Field of Classification Search
USPC ...................... 455/422.1, 423, 446
See application file for complete search history.

(56) References Cited

U.S. PATENT DOCUMENTS

2004/0116111 A1 * 6/2004 Saunders ...................... 455/423

FOREIGN PATENT DOCUMENTS

| WO | 2010/080845 A2 | 7/2010 |
|---|---|---|
| WO | 2011/136711 A1 | 11/2011 |

OTHER PUBLICATIONS

EPO, Int'l Searc Report in PCT/SE2011/050831, Oct. 17, 2011.
EPO, Written Opinion in PCT/SE2011/050831, Oct. 17, 2011.

(Continued)

*Primary Examiner* — Vladimir Magloire
*Assistant Examiner* — Natasha Cosme
(74) *Attorney, Agent, or Firm* — Patent Portfolio Builders PLLC

(57) ABSTRACT

The present invention relates to a method in a network node of a wireless communication system, for configuring a pattern for a reduced transmission activity. The pattern may e.g. be a positioning reference signal muting pattern used for improving PRS reception quality of a UE. The method comprises obtaining (610) information relating to radio characteristics for a cell, and determining (620) the pattern for the reduced transmission activity in the cell based on the obtained information. The method also comprises applying (630) the determined pattern for the reduced transmission activity.

14 Claims, 10 Drawing Sheets

(56) References Cited

OTHER PUBLICATIONS

Motorola "Improving PRS Hearability by Time-Offsetting PRS Subframes" 3GPP Draft R4-101323; 3rd Generation Partnership Project, Mobile Competence Centre; Sophia-Antipolis Cedex, France, RAN WG4, Dublin, Ireland; 20100412, retrieved on Apr. 9, 2010, XP050427436.

Motorola "On the Hearibility Issue for OTDOA-based Positioning Support for LTE Rel-9" 3GPP Draft R1-090791; 3rd Generation Partnership Project, Mobile Competence Centre; Sophia-Antipolis Cedex, France, Athens, Greece; 20090203, retrieved on Feb. 3, 2009, XP050318648.

3GPP TS 36.211, V9.1.0 Technical Specification Group Radio Access Network; Evolved Universal Terrestrial Radio Access (E-UTRA); Physical Channels and Modulation (Release 9), Mar. 2010.

3GPP TS 36.355, V9.2.1 Technical Specification Group Radio Access Network; Evolved Universal Terrestrial Radio Access (E-UTRA); LTE Positioning Protocol (LPP) (Release 9), Jun. 2010.

3GPP TS 36.133, V9.4.0 Technical Specification Group Radio Access Network; Evolved Universal Terrestrial Radio Access (E-UTRA); Requirements for support of radio resource management (Release 9), Jun. 2010.

3GPP TS 36.314, V9.1.0 Technical Specification Group Radio Access Network; Evolved Universal Terrestrial Radio Access (E-UTRA); Layer 2—Measurements (Release 9), Jun. 2010.

3GPP TS 36.213, V9.2.0 Technical Specification Group Radio Access Network; Evolved Universal Terrestrial Radio Access (E-UTRA); Physical layer procedures (Release 9), Jun. 2010.

EPO, Written Opinion in PCT/SE2011/050831, Nov. 19, 2012.

Nokia Siemens Networks et al., HeNB Power Control, 3GPP Tdoc R1-102977, May 10, 2010, pp. 1-7, TSG RAN WG1 Meeting #61, Montreal, CA.

Nokia Corp et al., On Resource Partitioning between Macro and HeNBs, 3GPP Tdoc R4-102978, Aug. 23, 2010, pp. 1-9, TSG RAN WG4 Meeting #56, Madrid, ES.

* cited by examiner 10  20

METHOD AND NODE FOR REDUCED TRANSMISSION ACTIVITY PATTERN CONFIGURATION

TECHNICAL FIELD

The disclosure relates in general to a method and arrangement in a wireless communications system, and in particular to a network node and a method in the network node for configuring a pattern for a reduced transmission activity, where the pattern is used for improving reception quality of a user equipment.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a user equipment (UE) 150 is wirelessly connected to a base station (BS) 110a commonly referred to as an evolved NodeB (eNodeB), as illustrated in FIG. 1a. Each eNodeB 110a-c serves one or more areas each referred to as cells 120a-c, and are connected to the core network. In LTE, the eNodeBs 110a-c are connected to a Mobility Management Entity (MME) 130 in the core network. A positioning node, also called a location server, may be connected to the MME 130. The positioning node is a physical or logical entity that manages positioning for a so called target device, i.e. a wireless device that is being positioned, and is in a control plane architecture referred to as an Evolved Serving Mobile Location Center (E-SMLC) 140. As illustrated in FIG. 1a, the E-SMLC 140 may be a separate network node, but it may also be a functionality integrated in some other network node. In a user plane architecture, the positioning is a part of a Secure User Plane Location (SUPL) Platform (SLP).

LTE Positioning Protocol (LPP) and LTE Positioning Protocol annex (LPPa) are protocols used for carrying out positioning in the control plane architecture in LTE. LPP is also used in the user plane architecture, whilst LPPa may be used to support user plane positioning. When receiving a positioning request, the E-SMLC may request positioning related parameters from eNodeB via LPPa. The E-SMLC then assembles and sends assistance data and the request for the positioning to the target wireless device, e.g. the UE, via LPP. FIGS. 1b-c illustrate example architectures and protocol solutions of a positioning system in an LTE network. In the control plane solution, illustrated in FIG. 1b, the UE communicates with the E-SMLC transparently via the eNodeB and the MME over LPP, and the eNodeB communicates with the E-SMLC transparently via the MME over LPPa. The user plane solution illustrated in FIG. 1c does not rely on the LPPa protocol, although 3GPP allows for the possibility of inter-working between the control and user plane positioning architectures. The SLP is the positioning node for user-plane positioning, similar to E-SMLC for control plane positioning, and there may or may not be an interface between the two positioning servers.

UE positioning is a process of determining UE coordinates in space. Once the coordinates are available, they may be mapped to a certain place or location. The mapping function and delivery of the location information on request are parts of a location service which is required for basic emergency services. Services that further exploit location knowledge or that are based on the location knowledge to offer customers some added value are referred to as location-aware and location-based services. The possibility of identifying a wireless device's geographical location in the network has enabled a large variety of commercial and non-commercial services, e.g., navigation assistance, social networking, location-aware advertising, and emergency calls. Different services may have different positioning accuracy requirements imposed by an application. Furthermore, requirements on the positioning accuracy for basic emergency services defined by regulatory bodies exist in some countries. An example of such a regulatory body is the Federal Communications Commission regulating the area of telecommunications in the United States.

In many environments, a wireless device position such as a UE position may be accurately estimated by using positioning methods based on Global Positioning System (GPS). Nowadays, networks also often have a possibility to assist wireless devices in order to improve the device receiver sensitivity and GPS start-up performance, as for example in an Assisted-GPS (A-GPS) positioning method. GPS or A-GPS receivers, however, may not necessarily be available in all wireless devices. Furthermore, GPS is known to often fail in indoor environments and urban canyons. A complementary terrestrial positioning method, called Observed Time Difference of Arrival (OTDOA), has therefore been standardized by 3GPP.

With OTDOA, a wireless device such as a UE measures the timing differences for downlink reference signals received from multiple distinct locations. For each measured neighbor cell, the UE measures Reference Signal Time Difference (RSTD) which is the relative timing difference between a neighbor cell and the reference cell. As illustrated in FIG. 2, the UE position estimate is found as an intersection 230 of hyperbolas 240 corresponding to the measured RSTDs. At least three measurements from geographically dispersed BSs 210a-c with a good geometry are needed to solve for two coordinates of the UE and the receiver clock bias. In order to find the position, precise knowledge of transmitter locations and transmit timing offsets is needed. Position calculations may be conducted, for example by a positioning node such as the E-SMLC or the SLP in LTE, or by the UE. The former approach corresponds to a UE-assisted positioning mode, and the latter corresponds to a UE-based positioning mode.

To enable positioning in LTE and facilitate positioning measurements of a proper quality and for a sufficient number of distinct locations, new physical signals dedicated for positioning, such as positioning reference signals (PRS) have been introduced, and low-interference positioning subframes have been specified in 3GPP. Even though PRS have been specifically designed for positioning measurements and in general are characterized by better signal quality than other reference signals, the standard does not mandate using PRS. Other reference signals, e.g., Cell-specific Reference Signals (CRS) may also be used for positioning measurements.

PRSs are transmitted from one antenna port (R6) according to a pre-defined pattern, as described for example in clause 6.10.4 in 3GPP TS 36.211, v9.1.0, 2010-03-30. One of the currently agreed PRS patterns is shown in FIG. 3b, where the squares marked with $R_6$ indicate PRS resource elements within a block of twelve subcarriers over fourteen OFDM symbols. Fourteen OFDM symbols correspond to a 1 ms subframe with normal cyclic prefix.

A set of frequency shifts may be applied to such a predefined PRS pattern to obtain a set of orthogonal patterns which can be used in neighbor cells to reduce interference on the PRS and thus improve positioning measurements. The effective frequency reuse of six can be modelled in this way. The frequency shift may be defined as a function of Physical Cell Identity (PCI) as follows:

$$v_{shift} = \mod(PCI, 6)$$

in which $v_{shift}$ is the vertical frequency shift, mod( ) is the modulo function.

To improve hearability of the PRS, i.e., to enable detecting the PRS from multiple sites and with a reasonable quality, positioning subframes have been designed as low-interference subframes. It has thus also been agreed that no data transmissions are allowed in general in positioning subframes. As a result, synchronous networks' PRSs are ideally interfered with only by PRS from other cells having the same PRS pattern index, i.e., the same vertical frequency shift, and not by data transmissions.

In partially aligned asynchronous networks, PRS may still be interfered with by transmissions over data channels, control channels, and any physical signals when positioning subframes collide with normal subframes, although the interference is reduced by the partial alignment, i.e., by aligning the beginnings of positioning subframes in multiple cells within one-half of a subframe with respect to some time base.

PRS are transmitted in pre-defined positioning subframes grouped by a number $N_{PRS}$ of consecutive subframes, i.e. one positioning occasion, as illustrated in FIG. 3a. Positioning occasions occur periodically with a certain periodicity of N subframes, corresponding to a time interval $T_{PRS}$ between two positioning occasions. The standardized time intervals $T_{PRS}$ are 160, 320, 640, and 1280 ms, and the number of consecutive subframes $N_{PRS}$ are 1, 2, 4, and 6.

As PRS from multiple distinct locations need to be measured for OTDOA positioning, the UE receiver may have to deal with PRS that are much weaker than those received from the serving cell. Furthermore, without the approximate knowledge of when the measured signals are expected to arrive in time and what is the exact PRS pattern, the UE would need to do signal search within a large window which would impact the time and accuracy of the measurements as well as the UE complexity. To facilitate UE measurements, the network transmits assistance data to the UE, which includes, among the others, reference cell information, neighbour cell list containing PCIs of neighbour cells, the number of consecutive downlink subframes, PRS transmission bandwidth, and frequency.

PRS may be transmitted with a reduced power. This is also referred to as PRS muting. The muting should then apply for all PRS resource elements in all subframes of a PRS positioning occasion over the entire PRS transmission bandwidth. A PRS positioning occasion comprises of the consecutive downlink subframes containing the PRS signals. A PRS positioning can contain up to six consecutive downlink PRS subframes. The PRS signals transmitted from the neighboring cells can overlap. This means the PRS transmitted in an aggressor cell may cause interference to the UE when the UE performs PRS measurement such as RSTD measurements in a neighboring cell. The PRS muting is applied to the PRS transmitted in the aggressor cell. The purpose of the muting is thus to reduce the interference for a UE measuring the PRS in a cell which is neighbor to the aggressor cell. In a special case, PRS are transmitted with zero power, which means that they are simply not transmitted.

It is not specified by the standard how a PRS muting pattern is generated. Only the signaling means enabling the positioning node to configure a PRS muting pattern at the UE is specified. A muting pattern is thus decided by the network and may be signaled to the UE with the OTDOA assistance data. If the muting pattern is not signaled for a particular cell, the UE can assume that muting is not applied in this cell. If the muting pattern is signaled for a cell, the UE can assume that PRS are not transmitted in the corresponding cell in the positioning occasions which are muted. There are no restrictions on muting pattern configurations, i.e. the network has full flexibility to decide the pattern. For each cell where the muting pattern is applicable, the muting pattern configuration is signaled as a bit string, also called a muting sequence, where a bit which may have a value 0 or 1, indicates whether PRS is muted or not in the positioning occasion defined by the bit position in the bit string and the reference time point for the muting pattern. For example a pattern [00001111] associated with a cell with e.g. cell ID #10, means that the first four PRS positioning occasions are muted in cell #10. Muting is described in 3GPP TS 36.355, v9.2.1, Section 6.5.1.2, 2010-06-22. Sometimes muting sequence is used interchangeably with muting pattern.

Furthermore, RSTD accuracy requirements and RSTD measurement requirements defined in the 3GPP standard in 3GPP TS 36.133, v9.4.0, 2010-06-21, section 9.1.10 and 8.1.2.5-6, give the requirements for PRS in terms of a minimum PRS configuration such as a minimum number of positioning subframes per positioning occasion, and a minimum number M of positioning occasions for measuring at least n cells.

Several muting pattern solutions have already been mentioned or discussed in 3GPP at different levels of details. However, many of them are not applicable since they either do not take into account positioning measurement requirements, or are not meant for PRS muting over the entire positioning occasion. That the PRSs should be muted over the entire positioning occasion is a limitation that was recently introduced into the 3GPP standard. Two examples of known muting patterns are autonomous random muting patterns and PCI-based patterns.

With autonomous random muting patterns, the muting in cells is random. Each eNodeB decides whether PRS transmissions should be ceased or not, and the muting decision is made with some probability. In a simple implementation, there is no coordination among eNodeB's and the probability is statically configured per eNodeB or per cell. An advantage with random muting patterns is that no signaling is needed among eNodeB's. However, signaling of muting patterns over LPP has anyhow been recently introduced in the standard. A disadvantage with random muting patterns is that networks are typically inhomogeneous, with different cell coverage areas and user density and possibly with different types of BSs, which implies that a setting of optimal muting probabilities is as difficult as designing muting patterns in a planned and coordinated way. The primary objective of the PRS muting is to lower interference due to PRS transmission from an aggressor cell towards the victim UE when it performs PRS measurement in a neighbor cell. In heterogeneous deployment the cells operating at higher power, such as macro cells, are likely to have more adverse impact on the reception quality of signals received by the UE when it measures on PRS from low power neighboring cells, such as pico cells. The PRS muting based on random scheme does not guarantee that muting will be applied to the positioning occasions in all the aggressor cells. Hence random muting cannot fully guarantee the reduction of interference in network deployment especially where cells operate at different power levels. At the same time, designing muting patterns in a planned and coordinated way is likely to be more efficient than the random approach. This is because the network can ensure that the muting is applied in a selective manner to the PRS signals transmitted by all the aggressor cells causing significant interference to the UE.

PCI-based patterns imply designing a limited set of muting patterns and mapping the muting pattern identities to PCIs. An advantage with PCI-based patterns is that the UE may, given a table of muting patterns and the PCI received in the assistance information, find out when the PRSs are transmitted in the cell of interest without the muting information being explicitly signaled to the UE. However, as in the case of random muting patterns, this is less important since the signaling is allowed by the standard. A disadvantage with PCI-based patterns is that there is no flexibility as the configuration is based on a static cell planning. There is thus no possibility to re-plan a part of the network to address the positioning needs, and no possibility for planning and optimization in general, which is a big disadvantage in networks which are inhomogeneous by nature and may involve various types of BSs.

Hence, random muting patterns and PCI-based patterns are not flexible, and do not allow for planning and optimization of positioning performance. They are thus very difficult to adopt for inhomogeneous networks which are not planned specifically for positioning. Most of the conventional muting solutions are statically configured. Furthermore, in some conventional solutions it has been common to assume patterns that are cyclic shifts of each other, while in practice a network with cells of various sizes and different types of BSs would benefit from using different patterns, as has been captured in the random pattern solution where the probabilities are different for the different cells.

Muting and muting pattern may also in a more general way be referred to as a reduced transmission activity and a pattern for reduced transmission activity respectively, since muting can be viewed as a special case of reduced transmission activity. Reduced transmission activity patterns may be applicable not only for positioning muting, but also for interference coordination in heterogeneous networks, where reduced transmission activity schemes are adopted when creating blank or almost blank subframes.

SUMMARY

It is an object to address some of the problems outlined above, and to allow for a flexible configuration of a pattern for reduced transmission activity based on radio characteristics of a cell. This object and others are achieved by the method and the network node according to the independent claims, and by the embodiments according to the dependent claims.

In accordance with one embodiment, a method in a network node of a wireless communications system for configuring a pattern for a reduced transmission activity is provided. The pattern is used for improving user equipment signal reception quality. The method comprises obtaining information relating to radio characteristics for a cell, and determining the pattern for the reduced transmission activity in the cell based on the obtained information. The method also comprises applying the determined pattern for the reduced transmission activity.

In accordance with another embodiment, a network node for a wireless communications system is provided. The network node adapted to configure a pattern for a reduced transmission activity, the pattern being used for improving user equipment signal reception quality. The network node comprises a processing unit configured to obtain information relating to radio characteristics for a cell, and to determine the pattern for the reduced transmission activity in the cell based on the obtained information. The processing unit is also configured to apply the determined pattern for the reduced transmission activity.

An advantage of embodiments disclosed herein is that a flexible determination of the pattern for reduced transmission activity based on radio characteristics is allowed. This leads to pattern configurations adapted to the current radio characteristics in a cell, thus allowing for reduced interference and an improved signal reception quality at a UE and a BS. The reduced interference may be important in various scenarios such as in a positioning scenario and in heterogeneous networks.

Other objects, advantages and features of embodiments will be explained in the following detailed description when considered in conjunction with the accompanying drawings and claims.

DETAILED DESCRIPTION

Figure 1A:
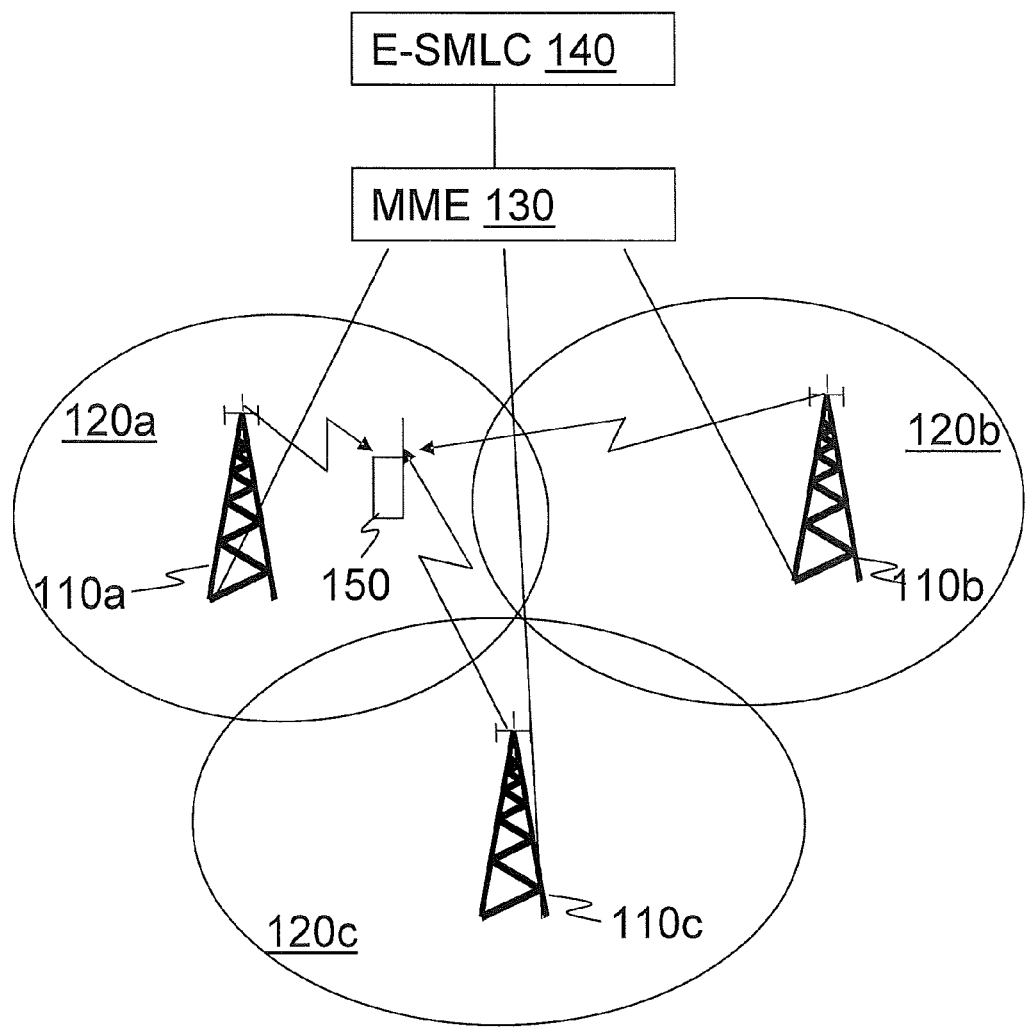
FIG. 1a is a schematic illustration of a conventional wireless communications system wherein embodiments may be implemented.
Figure 1B:
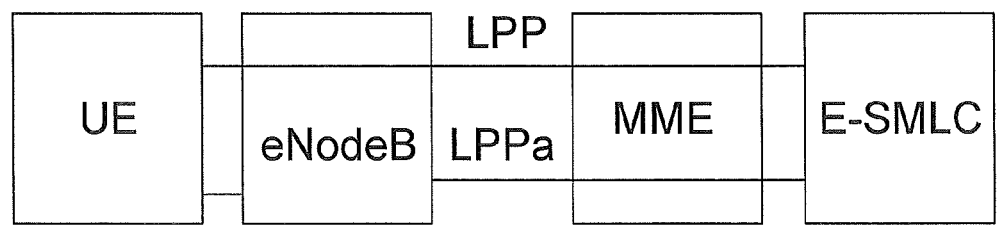
FIGS. 1b-1c are block diagrams schematically illustrating positioning related entities and protocols in LTE.
Figure 1C:
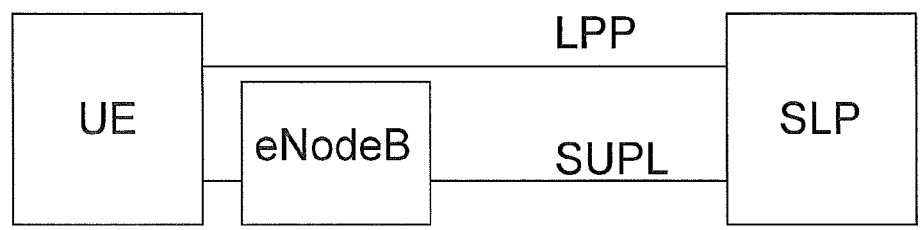
Figure 2:
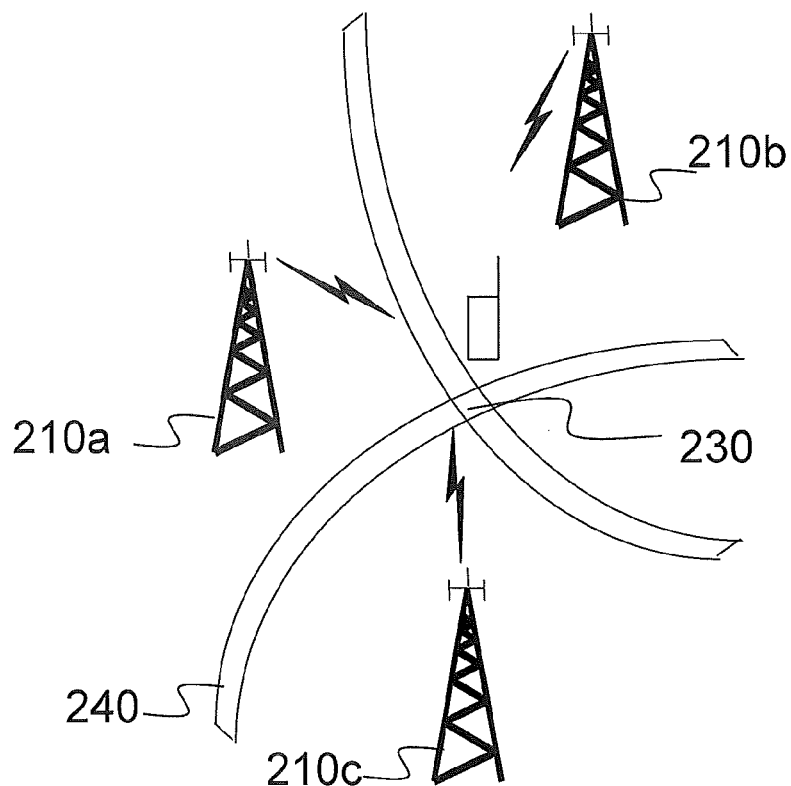
FIG. 2 is a schematic illustration of the OTDOA principle.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an Application Specific Integrated Circuit (ASIC). It will also be appreciated that while the embodiments are primarily described in the form of a method and device, they may also be embodied in a computer program product as well as in a system comprising a computer processor and a memory coupled to the processor, wherein the memory is encoded with one or more programs that may perform the functions disclosed herein.

Embodiments are described herein by way of reference to particular example scenarios. Particular aspects are described in a non-limiting general context in relation to an LTE network applying PRS and PRS muting for OTDOA positioning measurements. As described above, the terms reduced transmission activity and muting and their derivates reduced transmission activity pattern and muting pattern, are used interchangeably when relevant, since muting can be viewed as a special case of reduced transmission activity. This implies that the embodiments for muting can be generalized to the reduced transmission activity case. Furthermore, embodiments may be applied not only for positioning but also for other features, services, and network operation modes and deployments. One example is adopting reduced transmission activity schemes for heterogeneous network deployments, e.g. when creating blank or almost blank subframes.

Furthermore, the invention relates more generally to transmission activity patterns, i.e. not necessarily be limited to reduced power patterns. The indicated subframes of such pattern may e.g. be associated with higher power transmissions or higher transmission probability.

Most of the conventional muting solutions are statically configured and do not take into account measurements to adapt to the actual radio environment conditions which may change drastically during a day or from day to day. This is addressed in embodiments by a solution where a network node obtains information about a cell's radio characteristics and determines a pattern for a reduced transmission activity in the cell based on the obtained information. The network node then applies the determined pattern, which thus results in the use of a transmission pattern that is adapted to the current radio environment.

Furthermore, the following features relating to different example embodiments are described in this disclosure:

Design of transmission activity patterns based on rate and density properties.

Extending the pattern concept to multi-level patterns: Known signalling of PRS muting patterns concern only the case when PRS are not transmitted in the cell, i.e. are completely muted. The 3GPP standard, however, does not prohibit PRS transmission at a reduced power level. Patterns for such reduced PRS transmission activity cannot be signalled according to the known signaling methods. To address this issue, multi-level patterns are described as a part of a general pattern described in this disclosure.

Distributed design of reduced transmission activity patterns based on eNodeB measurements.

Signaling means for muting coordination among cells or BSs.

A guideline map and methods for deriving the rate and density parameters for reduced transmission activity for positioning.

In embodiments disclosed herein, reduced transmission activity patterns applicable both for positioning muting and interference coordination in heterogeneous networks in general are provided. However, the guideline map with the involved measurements is designed for positioning patterns. Furthermore, heterogeneous network aspects are also addressed in the context of positioning.

A transmit pattern or signal transmit pattern is a set of rules regulating transmissions of signals from a node where a node comprises a transmission point in a general sense. Such a transmission point may be a BS, such as an eNodeB, a home BS, or a pico BS. The transmission point may also be a relay, an antenna port, or a remote radio head. A pattern is associated with either overall transmissions from the node or particular signal(s) such as PRS, or channel(s) such as data channels and/or control channels. In the same network or even in the same node, different patterns may be designed to serve different purposes. The patterns may be used for different signals and/or channels, may implement different rules, and may be used for different measurements. This disclosure relates to general principles for configurable patterns and a particular set of rules designed for e.g. PRS.

A transmit pattern may in general be described by at least the following parameters:

A sequence with indicators of low or reduced transmission activity time instances.

A reference time point.

A cyclic shift.

The above combination of parameters may e.g. be used for PRS, with suitable settings to coordinate the PRS interference. The signaling over LPP and LPPa of the first two parameters has recently been standardized in 3GPP.

Furthermore, a pattern may also be characterized by:

A bandwidth and/or a frequency and/or a subset of subcarriers. By default it is often either the system bandwidth or the transmission bandwidth of the signal or channel of interest. However, a bandwidth or a certain part of the frequency spectrum may also be associated with the low transmission activity periods;

Transmit power levels corresponding to the indicated periods which may also be dependent on the BS type. As an example, the transmit power level given in a linear scale may be zero, which then corresponds to no transmission. It is also possible to characterize the pattern by indicating another power level below that of the normal or maximum power level.

Although the patterns may be encoded differently, any pattern may always be described at least by the above parameters.

Examples of designing configurable low or reduced transmission activity patterns are described hereinafter and the examples are extended to the multi-level pattern case where more than two power levels are assumed and/or more than two bandwidths or certain parts of the frequency spectrum are involved. Furthermore, the reference time point and cyclic shift parameters are discussed in the context of pattern coordination among cells, further described below.

Configurable Patterns for Reduced Transmission Activity

Two properties of reduced transmission activity patterns will be described hereinafter: A reduced transmission activity rate also called a muting rate in the case of positioning muting, and a reduced transmission activity or muting pattern density. Based on these properties, a generator may be constructed to create transmission activity sequences, such as muting sequences for positioning, using the muting rate and pattern density as input parameters. Two example generator functions are described: a generic function, and a special-case function assuming a certain relation between the two properties. The generator may be further extended to multi-level patterns as described below. The following paragraphs thus disclose a simple formalized approach for characterizing and generating low or reduced transmission activity patterns such as muting patterns, which is also extended to multi-level configurations.

A muting pattern or sequence may be characterized by at least two properties: the muting rate and the muting pattern density. The muting rate, also called low-activity rate, $\lambda$, defined for a muting pattern or sequence of a given length M in total number of time instances of the pattern or within the sequence, is given by the ratio of the number of time instances with muted signals to the total number of time instances M in the muting pattern or within the muting sequence. In embodiments, a time instance may be one or several subframes, where a subframe may also be a Multicast Broadcast Single Frequency Network (MBSFN) subframe.

In one embodiment, the muting rate used for deciding the muting pattern is one of a pre-defined set of muting rates (see Example 1 below with four rate levels). In an alternative embodiment, the muting rate is a value from a pre-defined set of muting rate ranges (see Example 2 below).

Example 1

Pre-Defined Muting Rate Levels

High: $\lambda=0.75$
Moderate: $\lambda=0.50$
Low: $\lambda=0.25$
No muting: $\lambda=0$ Example 2

Pre-Defined Muting Rate Ranges

High: $0.5<\lambda\leq 0.75$
Moderate: $0.25<\lambda\leq 0.50$
Low: $0<\lambda\leq 0.25$
No muting: $\lambda=0$ The muting pattern density, $\mu$, defined for a muting pattern of a given length M in total number of time instances of the pattern, is given by the ratio of the maximum number of consecutive time instances with muted signals to the total number of time instances (M) within the muting pattern.

In one embodiment, the muting pattern density used for deciding the muting pattern is one of a pre-defined set of densities (see Example 3 with three levels). In an alternative embodiment muting pattern density is a value from a pre-defined set of density ranges (see Example 4).

Example 3

Pre-Defined Muting Pattern Density Levels

Dense: $\mu=\mathbf{0.66}$
Sparse: $\mu=0.33$
Granular: $\mu=1/M$

Example 4

Pre-Defined Muting Pattern Density Ranges

Dense: $\mu\geq 0.5$
Sparse: $1/M<\mu<0.5$
Granular: $\mu=1/M$

For a given cell or a set of cells, the two parameters $\lambda$ and $\mu$ may be derived in a centralized or in a distributed way. They may thus e.g. be derived in a centralized way in an Operation and Maintenance (O&M) node, a positioning node, a radio network controller (RNC), or a centralized radio resource management unit for multi-cell centralized dynamic coordination of inter-cell interference. According to a distributed solution, they may alternatively be derived in a distributed way locally in eNodeB based on available measurements and/or by virtue of inter-node communication, e.g. via X2 in LTE.

Figure 4A:
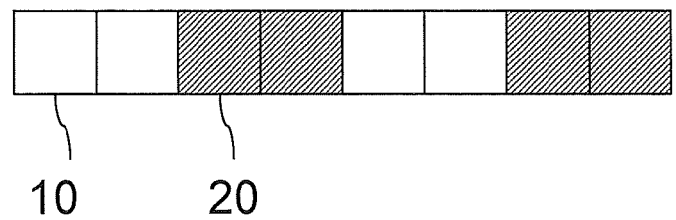
FIGS. 4a-4i are schematic illustrations of muting patterns.
Figure 4B:
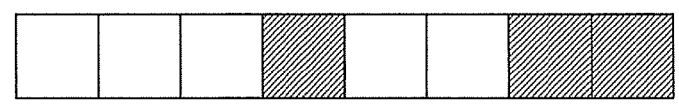

So, given M and a combination $(\lambda, \mu)$ where $\mu\leq\lambda$, one can generate a corresponding muting sequence. Note that the density parameter is in general related to the maximum number of consecutive subframes or positioning occasions, which also allows for irregular patterns that may contain several parts of different length, given in the number of consecutive subframes or positioning occasions, within the positioning muting sequence. FIGS. 4a and 4b illustrate regular and irregular muting patterns respectively, where the total number of time instances M=8, white squares 10 correspond to time instances with reduced transmission activity or muted signals, and striped squares 20 correspond to time instances with normal transmission activity. A time instance may be a subframe or a positioning occasion in the context of positioning.

When a set of patterns is pre-configured, each pattern may be associated to a pair of properties $(\lambda, \mu)$, and the selected pattern in a cell is the one with $(\lambda, \mu)$ matching best the parameter values currently associated with the cell, e.g. determined by the network node based on radio characteristics according to embodiments.

The sequences may be generated by a rule. An example rule is given hereinafter:

$$\mathrm{mod}(m,b)-M\cdot(\mu-k\cdot(a\mu-\lambda))\geq 0, \qquad (1)$$

where $\lambda$ and $\mu$ are the rate and pattern density parameters, m is the index of an element in the muting pattern or sequence and m=0,1, ..., M−1 and parameters a, b and k are defined as follows:

$$a = \lceil \lambda/\mu \rceil,$$
$$b = M \cdot \max(\mu, 1/a),$$
$$k = \begin{cases} 1, & \text{if } \lfloor m/b \rfloor - \lfloor \lambda/\mu \rfloor \geq 0 \\ 0, & \text{otherwise.} \end{cases}$$

With this rule, element with index m in the muting sequence is assigned value 1, which corresponds to a normal transmission activity, when the inequality of Eq. (1) holds, and 0, which corresponds to the reduced transmission activity, otherwise.

Eq. (1) can be viewed as a general rule, without any restriction on $\lambda$ and $\mu$. When $\lambda$ is a multiple of $\mu$, i.e. $\lambda=n\mu$ with some integer n, Eq. (1) simplifies to the following Eq. (2) which avoids using parameters a, b and k:

$$\mathrm{mod}(m,M\cdot\mu/\lambda)-M\mu\geq 0. \qquad (2)$$

Table 1 below in combination with FIGS. 4c-i illustrate a set of sequences generated with the rule in Eq. (2) while adopting the corresponding assumption on the values of $\lambda$ and $\mu$ which are shown in the table. There are eight time instances in the patterns in total. i.e. M=8. The special case $\lambda=0$ in the table corresponds to the case when time instances are never muted. Another special case which is not given in the table is $\lambda=1.0$ which corresponds to the case when time instances are always muted.

Since Eq. (2) is just a simpler version of Eq. (1) in this case, Eq. (1) would generate the same muting sequences for the given combinations of $\lambda$ and $\mu$. Other parameter combinations than those shown in Table 1 may also be envisioned.

TABLE 1

Muting sequences for different combinations of rate and density

Figure 4C:
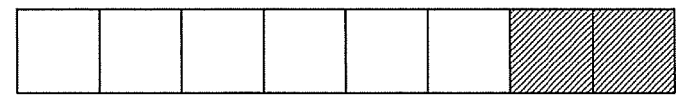
Figure 4D:
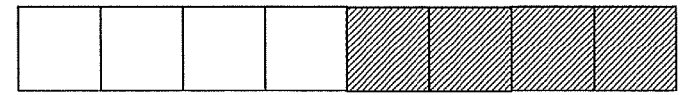
Figure 4E:
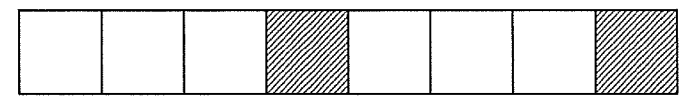
Figure 4F:
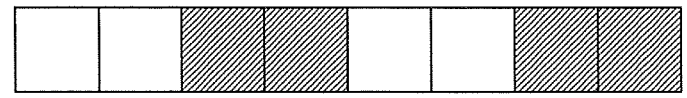
Figure 4G:
Figure 4H:
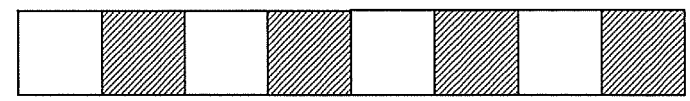
Figure 4I:
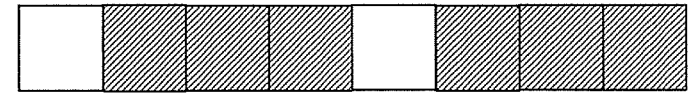

| | High $\lambda = 0.75$ | Moderate $\lambda = 0.5$ | Low $\lambda = 0.25$ | No $\lambda = 0$ |
|---|---|---|---|---|
| DENSE $\mu \geq 0.5$ | FIG. 4c $\mu = 0.75$ | FIG. 4d $\mu = 0.5$ | N/A | No muting |
| SPARSE $1/M < \mu < 0.5$ | FIG. 4e $\mu = 0.375$ | FIG. 4f $\mu = 0.25$ | FIG. 4g $\mu = 0.25$ | No muting |
| GRANULAR $\mu = 1/M$ | N/A | FIG. 4h $\mu = 0.125$ | FIG. 4i $\mu = 0.125$ | No muting |

In Table 1, the combination λ=0.75 and µ=1/M is not applicable (N/A). The reason is that for the definition of the muting density parameter to hold it is necessary that λM+n≤M so that every two sequences of µ/M time intervals with reduced transmission activity are separated by at least one interval with a normal transmission activity. Furthermore, the combination λ=0.25 and µ≥0.5 is N/A because µ≤λ is not fulfilled.

The examples described above can be further extended to multi-level patterns, where a pattern level is associated with at least one of the following parameters, which is different from the corresponding parameter in normal non-muted operation:
  Bandwidth;
  Frequency or a subset of subcarriers;
  Transmit power.

The reduced transmission activity periods or time instances of a pattern may also be associated with a bandwidth or a part of the frequency spectrum different from that used in the non-muted periods/time instances. In a particular example, the bandwidth refers to a part of the frequency spectrum used for the normal non-muted operation. In one approach the muting is applied only in time domain. This means the bandwidth or part of the frequency spectrum is the same during the muted and non-muted time instances e.g. 10 MHz in a muting pattern defined by muting sequence of [00001111] in time domain; where 0 and 1 denote the muted and non-muted time instances. In another approach the muting is applied in time as well as in frequency domain. This means the bandwidth or part the frequency spectrum is different during the muted and non-muted time instances. As an example the muting is applied over 5 MHz during muted time instance whereas the total bandwidth is 10 MHz e.g. a muting pattern defined by muting sequence of [00001111] in time domain corresponding to [5 5 5 5 10 10 10 101] MHz in frequency.

In another embodiment, muting or low transmission activity in one part of the spectrum may imply that the transmissions occur instead in a different part of the spectrum or in a different subset of subcarriers e.g. from the same transmission point. The different part of the spectrum or the different subset of subcarriers will not overlap with that of the normal non-muted operation and may also have a different bandwidth from that used in the normal non-muted operation.

A so called pattern level is thus associated with a decision comprising a setting of one or a combination of parameters where the setting characterizes a low-transmission activity which is different from the normal operation with non-reduced transmission activity, e.g. lower power, or different bandwidth. If more than one such parameter or parameter combination exist and describe different reduced transmission activity states, one speaks of more than two levels, where one of the levels corresponds to the normal operation or non-reduced transmission activity. The patterns which have been described previously in the disclosure are two-level patterns, where a muting level corresponds to zero power transmission and a non-muting level corresponds to the normal-operation power level in one embodiment. In other embodiments, reduced transmission activity periods in general may have a muting level when transmissions are allowed at a lower power level than that in the normal operation mode.

FIG. 4a illustrates a two-level pattern, where a transition from one level to the other is associated with a change of more than two parameters. A white square 10 corresponds to a time instance with low transmission activity implying the decision level "Low" for at least two of the parameters. "Normal" settings are used in other time instances, i.e. the striped squares 20.

"Normal" corresponds to a transmit power $P_{Normal}$, and a bandwidth $B_{Normal}$. The level "Low" corresponds to a transmit power lower than for normal operation, $P_{Low}<P_{Normal}$, and also a lower bandwidth than for normal operation, $B_{Low}<B_{Normal}$.

Figure 5A:
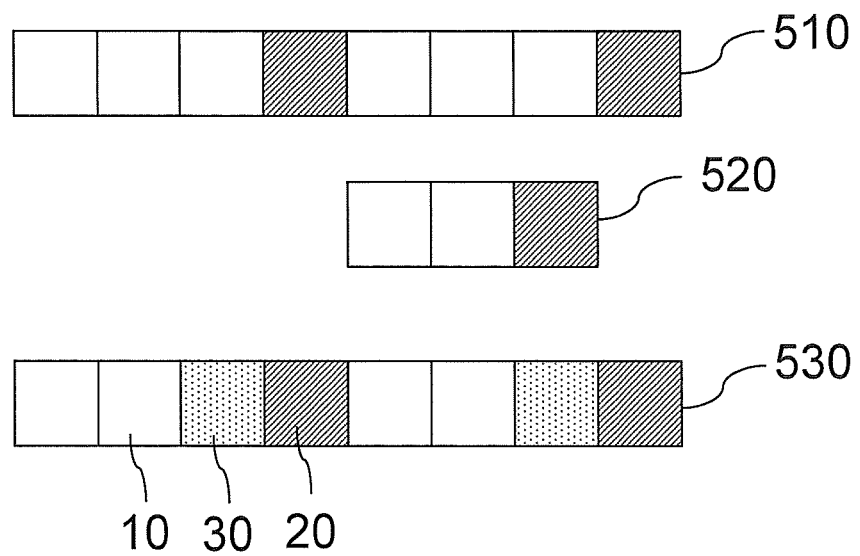
FIGS. 5a-5b are schematic illustrations of generation of multi-level patterns.
Figure 5B:
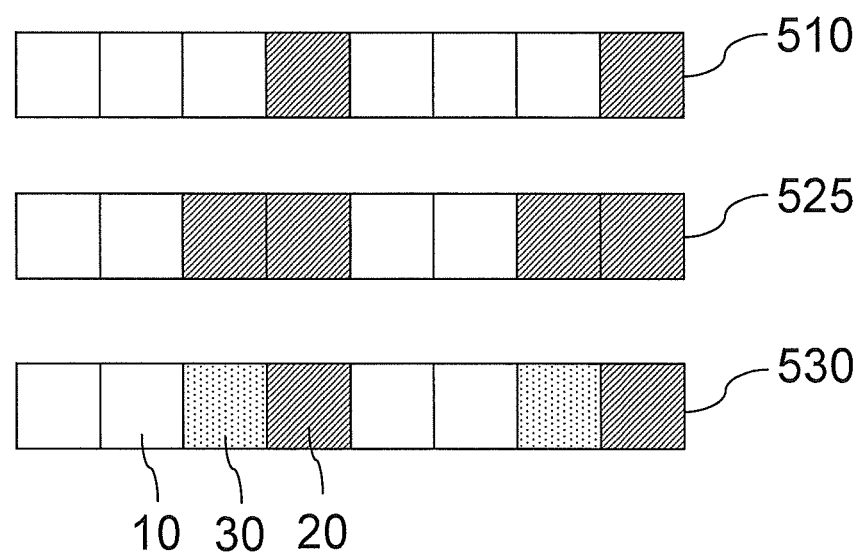

Two non-limiting example approaches of designing three-level patterns are described hereinafter. The approaches A and B are illustrated in FIGS. 5a and 5b respectively. The resulting three-level pattern is illustrated by 530, where a striped square 20 corresponds to the normal activity state, dotted squares 30 correspond to a so called moderate low activity state, and white squares 10 correspond to the low activity state. The approaches may be extended to cover a larger number of pattern levels as well.

Example Approach A in FIG. 5a:
  Step 1: Generate a two-level pattern for the entire sequence length M and (λ, µ). The result, a pattern 510 combining "Low" and "Normal" periods is obtained. In the example M=8.
  Step 2: Generate a two-level pattern 520 of length M'<M and (λ', µ') which is applied only to the "Low" parts of the pattern 510 obtained in Step 1. In the example illustrated in FIG. 5a, M'=3.
  Step 3: Combine the patterns obtained in Steps 1 and 2, to obtain the multi-level pattern 530.

Example Approach B in FIG. 5b:
  Step 1 is the same as in Example approach A, thus resulting in a first two-level pattern 510. In Step 2 a second two-level pattern 525 combining "Low" and "Normal" periods is generated for the entire pattern length M with a rate and pattern density defined by the parameters (λ", µ") which are applied on the entire pattern, with the prerequisite that λ"≤λ and µ"≤µ. In Step 3, the two patterns 510, 525 obtained in Steps 1 and 2 are combined into the multi-level pattern 530.

Coordination of Reduced Transmission Activity Patterns Among Cells

As explained above, a sequence for a reduced transmission activity is only one aspect of a pattern configuration. It is preferable that pattern configurations are coordinated among cells. Even if all cells adopt the same muting or reduced transmission activity sequence, at least two cells may have to use different total shifts to optimize the performance. As explained above, a reference time point and a cyclic shift may be used to describe a pattern. The total shift is a result of the pattern cyclic shift, its reference time point and the inter-cell time shift. In order to obtain different total shifts for two cells, the shifts have to be coordinated between cells or BSs. The total shift may be a function of at least one of:
  A pattern density: A total shift may e.g. be defined as a multiple of µM;
  The PCI, the Reference Signal (RS) pattern or the cyclic shift defined in 3GPP TS 36.211, v9.1.0, 2010-03-30, section 6.10.4. PRS and $v_{shift}$ for positioning are examples of the RS pattern and the cyclic shift. For pre-defined PCI-based RS transmission patterns, it is important to note that it is only in synchronized networks that PCIs by themselves may indicate whether RSs in two cells are orthogonal or not. In asynchronous networks, the relative time alignment between the cells' frames needs to be taken into account as well.
  A BS class: A same pattern, i.e. which may be described by the same sequence, cyclic shift and reference time point, may be used for BSs of the same class.

It may be expected that two similar neighbor cells of the same class use muting patterns with the same muting rate and muting density, so either the sequence or the parameters used to generate the sequence may be exchanged between the BSs over the X2 interface. However, the cyclic shifts and/or the reference time points may vary between the cells. No exchange of information over the X2 interface is necessary when the cells belong to the same BS, as the same pattern is configured and applied for the cells by the serving BS.

Signaling of Pattern Information and Use of Multiple Patterns

The pattern generated according to any of the embodiments described above and applied by the BS may be signaled to the UE or among network nodes. According to one embodiment, the generated sequence itself is signaled. In another embodiment, the parameters λ and μ used for generating the transmission activity sequence are signaled, allowing the receiving node to generate the sequence instead.

The same muting or reduced transmission activity pattern, or transmission activity level, may be used for different purposes. The same pattern may e.g. be used for heterogeneous deployment and for positioning measurements. In such a case an indicator may be signaled to the UE. The indicator informs the UE about whether the same pattern is applicable for feature #1, e.g. positioning measurements, and feature #2, e.g. heterogeneous network, or not. The advantage is that the signaling of the indicator allows for a reduction of the signaling overhead. The concept of signaling an indicator may be extended to more than two features.

Furthermore, the currently configured pattern used for a certain feature requiring low or reduced transmission activity may also be defined as a default pattern. This default pattern may be applicable to other features in case no specific pattern is configured for these other features.

Patterns of some features may also be defined to have a higher priority. When transmissions for a feature corresponding to a higher-priority pattern occur, the corresponding high-priority pattern is applied accordingly at defined time instances, and low-priority patterns in the same time instances will not be applied. When no pattern priorities are used in the set of features, the patterns may be combined. A signal may e.g. be muted when at least one of the patterns requires it, or more generally a signal transmission activity is changed when at least one pattern requires it.

Configurable Muting Patterns for Positioning

Figure 3A:
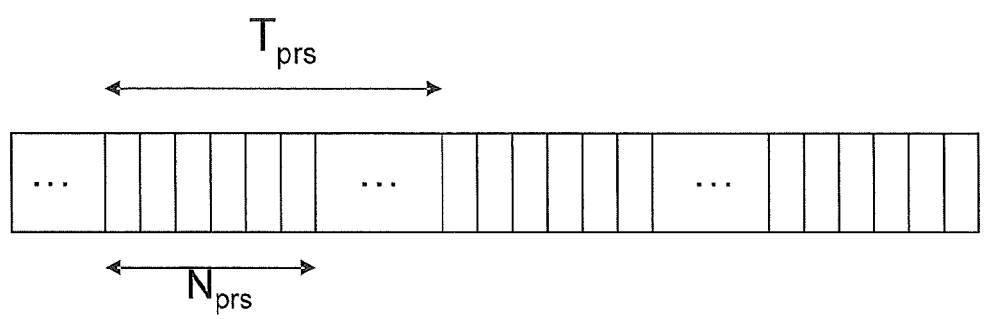
FIG. 3a is a schematic illustration for a cell of the positioning subframe allocation in time.
Figure 3B:
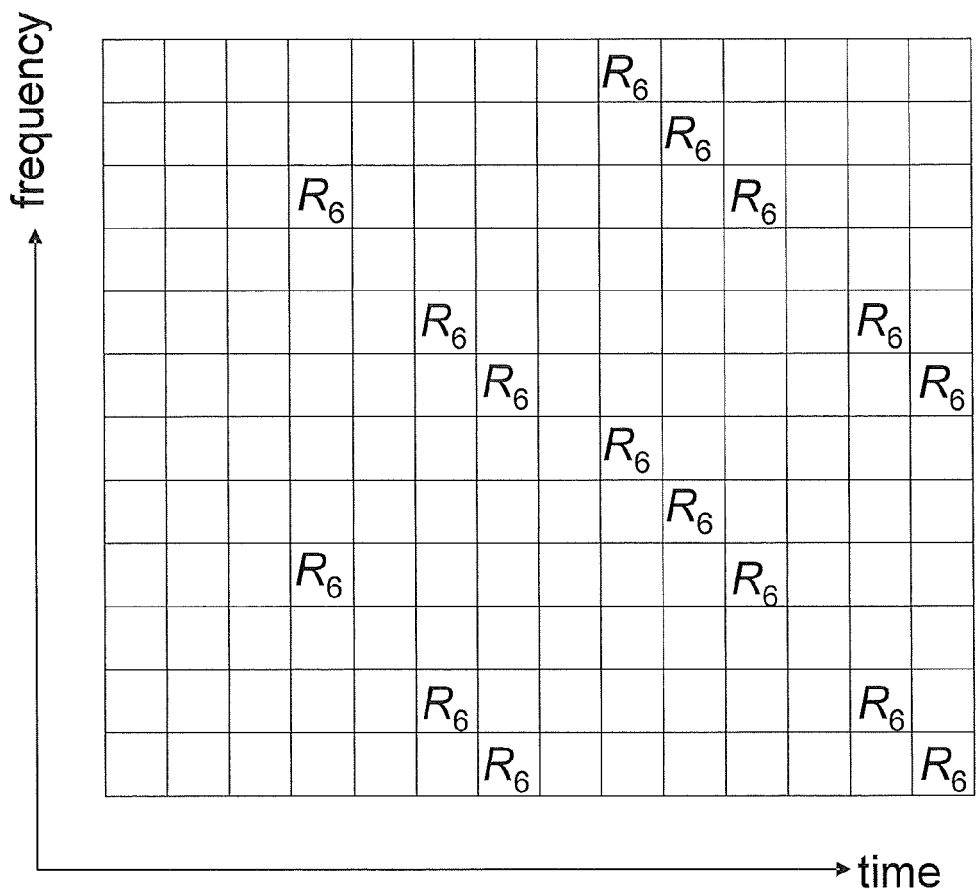
FIG. 3b is a schematic illustration of a PRS pattern in a time-frequency resource block.

All the embodiments described above apply for positioning, e.g. OTDOA positioning in LTE. For OTDOA positioning, the time instance used in the muting rate and muting pattern density definitions corresponds to a positioning occasion. The positioning occasion in LTE OTDOA is defined in clause 6.10.4 in 3GPP TS 36.211, v9.1.0, 2010-03-30, as a number of consecutive downlink low-interference subframes, as already described above with reference to FIG. 3a. The subframes of a positioning occasion may be MBSFN subframes. 3GPP TS 36.355, v9.2.1, Section 6.5.1.2, 2010-06-22, defines that one positioning occasion is the minimum time instance in a muting pattern in LTE Release 9. A guideline for determining muting patterns for positioning is described hereinafter, comprising a set of measurements and information which may be utilized to optimize the patterns.

The muting patterns are in one embodiment determined locally by a network node such as the eNodeB, utilizing available information and/or measurements. This was described above as the distributed solution. The patterns are then signaled over LPPa to the positioning node, e.g., the E-SMLC in the LTE control plane architecture, and from the positioning node to UEs in the assistance data. One alternative is that the pattern is determined locally and autonomously, and is thus not coordinated among the network nodes. However, the determination may also involve distributed coordination, which means that the network nodes locally take decisions about the patterns while taking into account information received from other network nodes. A network node may also combine its own measurements with the information received from the other network nodes. The eNodeB in LTE may e.g. autonomously set its own muting pattern while taking into consideration uplink and/or downlink eNodeB measurements received from other eNode Bs over the X2 interface.

In an alternative embodiment, muting patterns are determined in a centralized or semi-centralized manner, also based on available information and/or collected measurements. An example of semi-centralized coordination is when a network node responsible for coordination within a certain area and/or over a certain subset of BS, such as a subset of a certain BS type, determines the muting pattern. The network node may e.g. be an MME or a coordinating BS. A hybrid solution for deriving the muting pattern is also possible. The hybrid solution can be implemented in any network node including the one which transmits or sends signals according to the muting pattern, e.g. the eNode B in LTE. In the hybrid solution the derived pattern may be based on at least two of the following information sets:

A recommended pattern or other information provided by a centralized node, such as an O&M node;

Information or measurements received from other network nodes, such as eNode Bs;

Measurements performed internally by the network node, such as eNodeB timing measurements, or measurements of received signal strength or quality.

The distributed solution implies the use of signaling between network nodes responsible for the distributed determination of patterns, typically radio network nodes, while the centralized solution requires signaling between the central coordinating node and radio network nodes, and/or between the central coordinating node and the positioning node. The hybrid solution typically requires more extensive signaling, as it requires signaling both between radio network nodes and also between the radio network nodes and the node responsible for centralized coordination.

In situations where the network node may not be centrally coordinated, or when there is no possibility to exchange information with other nodes, it may be possible to use autonomous pattern detection. According to embodiments, a network node may try to detect a pattern used by other neighboring network nodes autonomously and determine e.g. either an own pattern or a pattern shift to apply based on the detected pattern. The pattern detection may be performed based on signals such as pilots or reference signals which are received from other cells and measured. Such an embodiment thus implies that a network node has a possibility to sense or measure the signals from other network node's cells. The pattern detection may also be performed based on detected UE multicast signals or multi-cell transmissions in cases when the UE transmits to more than one cell simultaneously.

Thanks' to the measurements of pilots or multicast signals, the network node may collect statistics over time and may identify time instances when the transmission activity of the cell of interest is different from the transmission activity of other time instances. When transmission activity patterns are pre-defined, the network node may try to match the observed activity statistics from another cell to each or some of the pre-defined patterns, thus reducing the probability of erroneous pattern detections. The matching may e.g. be done by correlating the activity statistics to the known pattern.

Pattern detection may be particularly useful when the patterns are statically or semi-statically configured, i.e. do not change frequently in time, and/or when there is no possibility to signal the information, e.g. when there is no X2 interface, and/or when a pre-defined or pre-configured limited set of patterns may be used in the network.

The above description of autonomous detection is described for a transmitting network node applying the detection method either to determine an own transmission activity pattern or to optimize own transmissions and own UE scheduling to avoid strong interference from neighbor cells. A similar principle and method may be adopted for UEs.

A guideline for determining muting patterns is described hereinafter. Information and measurements that are used for the determination of patterns are often already available or may be deduced, which allows for autonomous muting pattern determination. However, some new measurements and signaling for coordinating the muting patterns are also described, which allows either for the distributed or the centralized pattern determination. Although the following guidelines are described for the determination of PRS muting patterns, the principles are also applicable for determining reduced transmission activity patterns for non-positioning purposes.

Table 2 illustrates the guideline for determining muting patterns. The table describes a relation between a recommended PRS muting pattern configuration in terms of rate and/or density, and affecting factors such as radio characteristics for a cell or information relating to configuration of the cell. Radio characteristics may e.g. be related to observed performance or measurements in the cell. By determining a muting pattern in terms of rate and density based on information relating to radio characteristics, e.g. based on the information in Table 2, and by applying the determined muting pattern, an enhanced positioning performance is enabled, as the muting pattern is adapted to the various possible radio characteristics scenarios.

The vertical dimension of Table 2 corresponds to the pattern density, increasing from the bottom to the top of the table, while the horizontal dimension corresponds to the rate increasing from the right to the left of the table. The left up corner thus corresponds to a high value of both parameters, while the diagonally opposite corner corresponds to low values of both rate and density. The other two corners of the table correspond to the pattern parameters with a low value of one of the two parameters and a high value of the other one. Note also that the rate reflects the overall need for muting in the cell and also sets the upper bound on the pattern density.

The affecting factors such as different radio characteristics for the cell which are given in Table 2, are also described as being lower or higher. According to embodiments, low and high values of each of the affecting factors are defined by a threshold, i.e., low, lower or few means that the values are below a certain threshold, and high, higher, or many means that the values are above a threshold. Some threshold examples are given in the more detailed descriptions of the affecting factors below Table 2.

A PRS muting pattern determined according to an embodiment based on Table 2, may be a pattern where a reduced transmission activity period corresponds to a period when PRS is not transmitted. In another example, the reduced transmission activity may correspond to a period where a reduced power is applied to PRS, as already described above.

TABLE 2

Guideline for determining positioning patterns in own cell

| | $\lambda$: high | $\lambda$: medium | $\lambda$: low |
|---|---|---|---|
| $\mu$: high/dense | Pessimistic PRS configuration in a neighbor cell, i.e. small BW, small $N_{PRS}$, large $T_{PRS}$, and no alignment in the neighbor cell. | Intensive use of inter-frequency and/or inter-RAT measurements. Intensive use of DRX and power saving modes (number of configuration messages or number of UEs in such states). Non-full duplex configuration. Frame misalignment. | Pessimistic PRS configuration in own cell, i.e. small BW, small $N_{PRS}$, large $T_{PRS}$, and no alignment in own cell. |
| $\mu$: medium/sparse | No UEs in connected state in most cells in an area. High probability of not using OTDOA for positioning in a given environment. Low LPP and LPPa activity in the area. Low RSRQ or PRS quality for neighbor cells but high/reasonable quality for own cell; or low received signal power of neighbors relative to own cell. Power boosting used in neighbor cells. Own cell belongs to a low-power node and/or CRS can be used for positioning measurements in the cell, and no need in transmitting PRS ($\lambda$ = 1.0). Own cell is a macro cell and low-power nodes are present in the area. | | No UEs in connected state in own cell, but not in neighbor cells (given same-class BSs in the area). No emergency calls in own cell. Most of UEs have advanced receiver capabilities and/or are of Rel. 10 or higher. Low LPP activity (which may be OTDOA-related) on own cell, but high LPPa activity (which may be OTDOA-related). PRSs of own cell are used for positioning measurements when own cell belongs to a low-power node, $\lambda$ = 0 or close to 0 can be used. Own cell has small coverage. Own cell exercises cell range expansion. |

TABLE 2-continued

Guideline for determining positioning patterns in own cell

| | λ: high | λ: medium | λ: low |
|---|---|---|---|
| μ: low/granular | Own cell is a large cell. Power hearability of many neighbor cells concluded from the statistics of collected UE measurements related to minimizing drive test. Optimistic PRS configuration in own cell. | Many UEs with higher mobility. | Network optimized for heterogeneous deployment operation. Optimistic PRS configuration in neighbor cells. |

The affecting factors in Table 2 that may be used to determine the muting rate λ and/or the pattern density μ are described in more detail hereinafter. The factors are grouped into eight groups:

1. PRS Configuration

At least the following parameters describe a PRS configuration. The parameters relate to positioning accuracy and measurement requirements as specified in 3GPP TS 36.211, section 6.10.4, v9.1.0, 2010-03-30, and 3GPP TS 36.133, sections 9.1.10 and 8.1.2.5-6, v9.4.0, 2010-06-21:

PRS transmission bandwidth;
Number $N_{PRS}$ of configured downlink subframes in a positioning occasion;
Periodicity $T_{PRS}$;
Positioning subframe alignment among cells;

A small PRS transmission bandwidth, e.g. 6 or 15 resource blocks, and/or a small number of configured PRS subframes, e.g. 1 or 2 PRS subframes in a positioning occasion $N_{PRS}$ may be viewed as a pessimistic PRS configuration, since these factors are all likely to increase the measurement time and thus require more subframes with non-muted PRS. A pessimistic PRS configuration probably requires a higher muting density. The opposite is also true, i.e., that large values of the PRS transmission bandwidth and/or the number of configured subframes in a positioning occasion $N_{PRS}$ are factors that allow for a shorter total measurement time, and may thus be viewed as an optimistic PRS configuration.

It is obvious that a partial alignment of positioning subframes among cells is more challenging from the positioning requirements points of view. For a same measurement accuracy a partial alignment thus requires a longer measurement time, possibly longer than one positioning occasion, especially for a small measurement bandwidth or a small $N_{PRS}$. Thus, a large $T_{PRS}$ and/or partial alignment of positioning subframes can also be viewed as a part of a pessimistic PRS configuration.

It is preferred that cells with a pessimistic PRS configuration should not be muted too often. The conclusion is that a low muting rate and a high pattern density is preferable with a pessimistic PRS configuration. At the same time, to reduce interference to a cell to be measured having pessimistic PRS configuration, it may be preferable to increase muting rate in the aggressor cells which cause interference towards the measured cells.

When the periodicity $T_{PRS}$ is large, e.g. 1024 ms, it is more difficult to combine the signal over multiple positioning occasions and thus further increasing the time between occasions with transmitted PRS is not desirable. In this case the muting pattern will preferably have a high density and a lower rate.

The PRS configurations of cells are typically known to an eNodeB for its own cells and possibly also for neighbor eNodeB cells, e.g., when the neighbor eNodeB is from a same manufacturer, or when the PRS configuration is statically or semi-statically configured and thus known from O&M. Furthermore, the PRS configuration parameters described above may be the same in all cells of eNodeBs of a same type or power class, at least for eNodeBs in the same area. It may be assumed that eNodeBs of the same type or power class have the same PRS configuration everywhere, at least as a default setting. The system bandwidth for a cell is available via X2 and/or via broadcasted system information. This means that an eNodeB may be aware of the cell transmission bandwidth of its neighbor cells. Furthermore, the PRS transmission bandwidth cannot be larger than the total transmission bandwidth in a cell. When the total transmission bandwidth of all cells in a set of cells is the same, e.g. 10 MHz, it may be assumed that the PRS bandwidth of all these cells will also be the same.

2. Measurement Configuration

The following aspects impact positioning measurements and may therefore be taken into account when determining a muting pattern or deciding a muting configuration:

Intra-frequency, inter-frequency or inter-RAT measurements;
Effective measurement time per positioning occasion in case of inter-frequency and/or inter-RAT measurements;
DRX, i.e. Discontinuous Reception, configuration and/or other power saving operation;
Subframes configured for measurements in heterogeneous networks.

Terminals without the simultaneous multi-frequency and multi-RAT measurement capability perform inter-frequency and inter-RAT measurements using measurement gaps which limits the effective measurement time per cell. Most terminals require measurement gaps for performing inter-frequency and inter RAT measurements. The measurement time is affected by various factors including the time for the receiver to switch frequency, the extent to which the positioning subframes are aligned with the measurement gaps, i.e., number of full positioning sub-frames and their parts lying in the gap, and the number of cells to be measured.

Since measurement gaps are configured by the eNodeB, the eNodeB will have statistics on how often inter-frequency and inter-RAT positioning measurements are used in the cell. When these types of measurements are intensively used in the network, e.g. every 1-5 second for doing cell change such as handover, and are considered as important, it is preferable that the muting pattern density is high to simplify the measurement gap configuration. The muting rate will on the other hand depend on the interference situation. A similar situation applies for the use of DRX and power saving mode configuration. For cells with an intensive usage of long DRX (e.g. 1024 ms), i.e. when DRX is configured by default for all UEs accessing packet data, and for power saving mode configurations, i.e. with some measurement restrictions, the muting pattern density may preferably be high.

When muting or low transmission activity patterns are configured, e.g. in heterogeneous deployments, the same pattern density and rate parameters may be adopted for positioning patterns and/or vice versa, even though the sequence lengths may differ in the two cases.

3. System Configuration

The following system configuration aspects may be taken into account when determining a muting pattern:

The use of system duplex, such as Frequency Division Duplex (FDD), Time Division Duplex (TDD), variable duplex, and half duplex FDD;

System synchronization and frame alignment.

The duplex information is part of the system configuration known in BSs which may be utilized to determine muting configurations. Neighbor cell's duplex information may be obtained via X2. In half duplex FDD, the uplink and downlink transmissions occur at different times and on separate carriers. This may improve the measurement accuracy of the measurement quantity due to lower transmitter noise. However, due to the reduced effective measurement time the overall measurement period may become longer compared to the case of full duplex FDD. This may put some restrictions on using certain sub-frame configurations in order to meet the requirements. For example the eNode B may have to transmit at least a certain number of downlink sub-frames in a frame to enable ample measurement opportunity to the UE. Similar approach is used in LTE TDD where only a sub-set of sub-frames are downlink subframes. As an example, certain uplink/downlink TDD configurations are required to achieve certain positioning measurement accuracy (3GPP TS 36.133, sections 9.1.10 and 8.1.2.5-6, v9.4.0, 2010-06-21). Using a low muting pattern density may therefore degrade the performance even further, so a higher density is preferred for half duplex FDD configurations.

The system synchronization and frame alignment information may also be deduced from the system configuration or an O&M system, and may thus also be utilized when determining the muting configuration. For example, frame misalignment typically degrades a Signal to Interference-plus-Noise Ratio (SINR) and may thus require longer measurement time. A higher density of the muting patterns is therefore preferred in this case.

4. UE Statistics

The following are examples of UE statistics which may be helpful in determining the muting configuration:

Number of UEs in RRC_CONNECTED state: Cells with a low number of UEs in the RRC_CONNECTED state, e.g. 10 UEs, may indicate that the OTDOA, which requires RSTD measurements, is also lower. If this is true for all neighbor cells, PRS may not be needed at all and thus can be muted with a rate of one or close to one to also facilitate power saving in the base station. If there are few UEs in RRC_CONNECTED state in a serving cell, i.e. there is a low load in the serving cell, then the muting rate may be low in that cell since typically the highest interference is from the serving cell which in this example does not have many active UEs.

Number of Active UEs per Quality of service Class Identifier (QCI), e.g., as in 3GPP TS 36.314, section 4.1.3, v.9.1.0, 2010-06-18, or the number of active emergency calls: This metric may give an indication of the number of emergency calls for which accurate positioning is crucial. The decisions are similar to those for the number of UEs in the RRC_CONNECTED state.

Statistics on UEs with advanced receiver capabilities, such as interference cancellation for heterogeneous networks, or statistics on UEs of higher releases: Cells with many UEs with advanced receivers may be capable of dealing with high interference from the serving cell which is typically the strongest interferer, and thus muting may not be needed or the muting rate may be rather low to reduce the total measurement time.

Number of UE in long DRX. For a cell in which there are a large number of UEs that use long DRX, e.g. 50 UEs or more, the muting pattern density may preferably be high.

Number of UEs, such as the ones given in list hereinafter: The statistics may be estimated from the UL resource allocation for positioning measurement reports. The reports are transmitted over LPP, transparently via eNodeB, so eNodeB can at least collect the report statistics. In outdoor rural environments, GPS is typically used, so there may be no need for PRS when satellites' visibility is acceptable, so high-rate muting patterns may be configured e.g. for power saving. A difficult environment typically implies that more measurement samples per cell are necessary. In such a case it is better to have more consecutive measurement occasions and a higher density may be better. Furthermore, a higher rate may be needed if many UEs are suffering from interference from a neighbor cell.

Number of UEs whose position is determined e.g. positioning service usage in a particular coverage area;

Number of UEs whose position is determined with OTDOA, e.g. OTDOA positioning method usage in a particular coverage area;

Number of UEs in certain environments, e.g. where OTDOA is typically used such as indoor, or local area, and where the environments may also be defined by certain characteristics such as high-multipath or difficult environments, in addition or instead of being explicitly classified by type as 'indoor', 'outdoor', etc.

Number of UEs with higher mobility. A cell with many UEs with higher mobility will preferably use low-density patterns. The UE mobility state, e.g., low, medium or high, may be determined using state of the art methods e.g. by measuring UE Doppler frequency.

5. LPP Packet Statistics

LPP statistics may be available buy packet sniffing, i.e. the eNodeB "opens" all or some LPP packets which are otherwise transparently transmitted via the eNodeB. From each "opened" packet the information of interest may be extracted and added to a database maintained by the eNodeB. The database may then be used for example for configuring patterns.

Number of LPP packets relayed by eNodeB: Low LPP activity gives an indication on low usage of positioning services at a particular time. This may imply that either fewer users are using positioning services or users are sparsely using the positioning service, and the muting may be high.

Estimated number of UEs whose position is determined. The number of UEs can be estimated from the number of LPP requests and responses, and may then be used to determine the muting rate and density.

6. Interference Estimation

The following factors related to interference estimation may also be used to determine the muting pattern:

Constructed sets of interferers: Based on neighbor cell PCIs, which are e.g. available from neighbor information exchanged over X2, in combination with time offsets, which may e.g. be obtained from O&M, sets of mutually interfering cells may be derived. As an example, cells with PCI1 and PCI2 may be considered as mutually interfering with respect to PRS when mod (PCI1,6)=mod(PCI2−num_symb,6), where num_symb is the relative time shift between the two cells measured in symbols. If cell with PCI2 has a high interference to the neighbor cell with PCI1, cell with PCI 2 may have to mute.

Received signal strength and/or quality measurements available in eNodeB, such as Reference Signal Received Quality (RSRQ) and Reference Signal Received Power (RSRP) reported for multiple cells. For example, a low RSRQ gives an indication of high interference. Low RSRQ in most cells, such as −10 dB or −14 dB or lower, where one particular cell is always an interferer, indicates that this particular cell needs to be muted. In such a case, a high muting pattern density is preferable, while the choice of muting rate depends on the PRS configuration. On the other hand, when there is more than one strong interferer in the same cell, the muting patterns shall preferably be sparse.

Nominal power and power boosting. For example, a cell-specific $P_B$ parameter signaled by higher layers [3GPP TS 36.213, v9.2.0, 2010-06-14, section 5.2], which defines the relative transmit power between different sets of symbols can be used for determining the muting rate. Power boosting is typically used to extend the cell coverage in coverage limited environments. Power boosting on PRS may increase the need for muting, i.e. the muting rate should be increased or higher. This is because power boosting means that a signal is transmitted at a higher power which improves the signal hearability, i.e., the signal will be possible to detect at a larger distance and in larger cells. At the same time, UEs close to the cell with boosted PRS power, cell 1, and measuring another cell 2, will experience high interference for cell 1 to signals from cell 2 if the signals from the two cells are transmitted at the same time.

7. Measurements Related to Minimizing Drive Tests

To facilitate network planning and to avoid manual logging of measurements especially in certain difficult or inaccessible locations, the UEs may be configured by the network using conventional methods to log measurements in idle and in connected state. These statistics are in turn used by the network for deploying new sites and for redeploying the existing ones, or for tuning network configuration to improve network performance. Such statistics based on UE measurements may also be used for determining the muting pattern. Examples of these statistics are:

Periodical downlink pilot measurements (e.g. RSRP, RSRQ);
Paging channel failure;
Broadcast Channel failure;
Physical layer problem detection, such as out of synchronization (out of sync) detection, in synchronization (in-sync) detection, or radio link failure report;
Radio Resource Control (RRC) connection failure;
RRC connection re-establishment.

The above statistics based on UE measurements may serve as indicators for a hearability level of certain signals or channels from some cells, e.g., CRS or PRS, both of which may be used for positioning. For example, CRS or PRS used for positioning since the nominal power for PRS may be the same or similar to those involved in the aforementioned UE measurements, such as CRS or Broadcast Control Channel (BCCH). The measurements are especially relevant for optimizing positioning patterns when the measurements are collected during time instances free of data interference or on signals/channels that are not interfered by data. The identified poor hearability of neighbor cells, e.g., low RSRP such as −110 dBm, or higher paging channel failure rate such as 10% or higher, may indicate the need for muting in an own cell. Furthermore, poor positioning performance may be used as a trigger for collecting the relevant UE measurement statistics, which may be used for analyzing the need for pattern optimization and/or triggering (re)configuration of muting or reduced transmission activity patterns.

8. Heterogeneous Network Aspects

The following factors related to heterogeneous network aspects may also be used to determine the muting pattern:

BS power level, which may include one or more of the following:
power class or type, such as macro, micro, pico, home;
Maximum BS output power or configured power—macro BS power is generally not pre-defined;
Maximum transmit power per PRB or per group of PRBs.

Mutually interfering cells belonging to BSs of different power classes shall preferably transmit at different times or different frequencies or subcarriers. The presence of many power classes in the area would therefore indicate dense muting patterns with higher muting rates, if orthogonal transmission is not possible to ensure by other means, e.g. by using other type of signals.

In a specific example, low-power nodes adopt muting patterns with the muting rate 0, i.e. no muting, while macro cells use a muting pattern with a rate higher than zero, e.g., $\lambda=0.5$ and $\mu=1/M$. In another specific example, low-power nodes adopt muting patterns with muting rate 1, i.e. always mute, implying that positioning measurements are performed on CRS for these nodes, even though the measurements may also be conducted during positioning subframes. At the same time, eNodeBs use PRS. So, muting patterns—if necessary—are designed depending on the interference. The interference comes in a fully synchronized network only from PRS, since in such a network PRS will collide with PRS of other cell PRS signals, but not with CRS. This is determined in clause 6.10.4 in 3GPP TS 36.211, v9.1.0, 2010-03-30, which specify in which resource elements the PRS are transmitted.

Relative BS transmit power with respect to the neighbor: The same transmit power in neighbor cells is an indication that the BS are likely to belong to the same power class. As a general rule of thumb, BSs transmitting at a higher power shall mute more often than BSs transmitting at a lower power.

Cell type or estimated coverage area class: The cell type may be used to indicate the cell coverage area, which may be e.g. very small, small, medium, or large. In a network, cells of various sizes may be present. A BS of a particular power class is typically used in a particular cell type. But on the other hand, the BS of the same power class may also be used in different cell coverage areas e.g. macro BS used in macro and also in medium range cells. A macro BS serving a medium range cell, may be configured to operate at a lower maximum output power. Hence explicit indication of the actual cell coverage area is useful in determining the muting rate. In very small cells such as pico or femto cells, muting is not likely to be needed since in the serving cell a cell identity based method may be quite accurate while the interference to neighbor cells is likely to be small due to low transmit power in this cell. In large cells such as macro cells, which may have 1 km cell radius or more, or micro cells with 500 ms radius, the muting rate is expected to be higher.

Cell range expansion: With a cell range expansion, the measurement quality of neighbor cells improves in the expanded area of the cell while the measurement quality in own cell degrades. Since typically the biggest problems are expected with the measurement quality for neighbor cells, it may be expected that the muting rate will decrease or be reduced with the cell range expansion unless the serving signal quality degrades too much. If serving cell quality degrades, it is reasonable to assume that the reference cell for UEs in the expanded cell range is more likely to be a neighbor cell and not the serving cell, especially when the cell selection bias is relatively large.

The pattern design concept and the methods in this disclosure may be applied for any of static, semi-static or dynamic patterns. The statically or semi-statically designed patterns may be determined based on estimated or measured performance indicators, or measurement statistics. The determination of dynamic patterns may rely on measurements and collected statistics, in order to dynamically adapt to the radio environment. Dynamic muting patterns used for positioning shall not be changed too often, i.e. not within seconds, as the change of pattern would then become comparable with the PRS periodicity in some PRS configurations. However, changing dynamic patterns a few times over a day is a reasonable practical implementation.

Description with Reference to FIGS. 6a-d and 7a-b

Figure 6A:
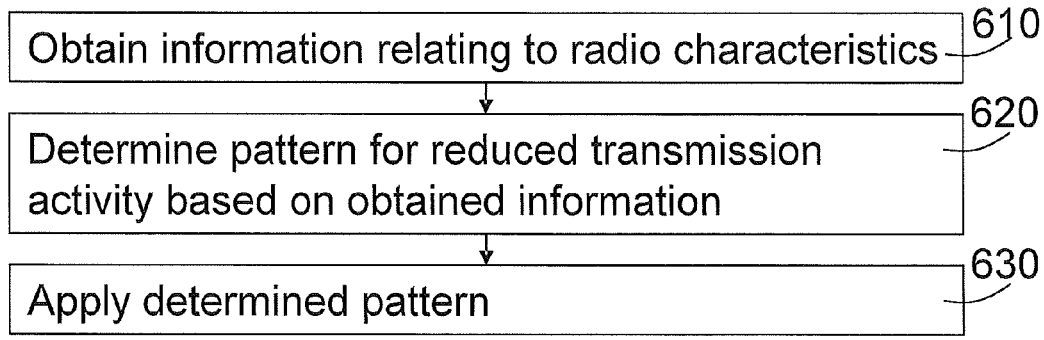
FIGS. 6a-6d are flowcharts of the method in the network node according to embodiments.

FIG. 6a illustrates a flowchart of a method in a network node of a wireless communications system for configuring a pattern for a reduced transmission activity, according to an embodiment. The pattern is used for improving UE signal reception quality, i.e. a uplink UE signal received at the BS or a downlink UE signale received by the UE. The pattern for the reduced transmission activity may e.g. be a PRS muting pattern, which is used to reduce the interference for a UE measuring PRS from another cell. The method comprises:

610: Obtaining information relating to radio characteristics for a cell.

620: Determining the pattern for the reduced transmission activity in the cell based on the obtained information.

630: Applying the determined pattern for the reduced transmission activity. When the determined pattern is applied, the transmission activity follows the pattern, and transmission activity is avoided or reduced during the time instances when the pattern prescribes reduced transmission activity.

Figure 6B:
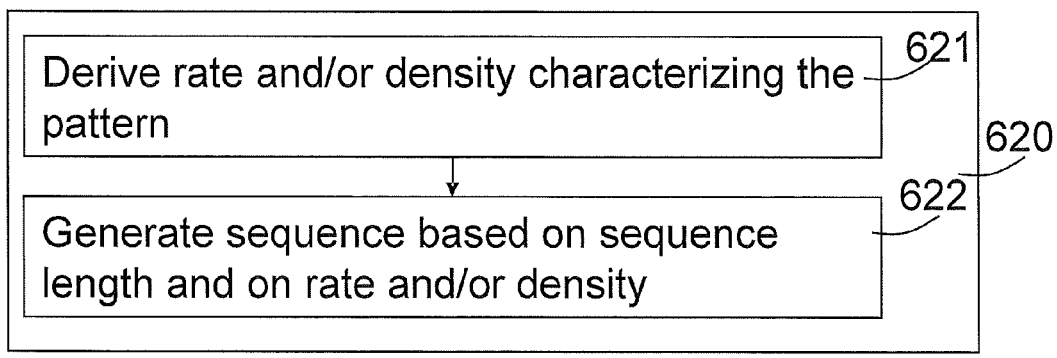
Figure 6C:
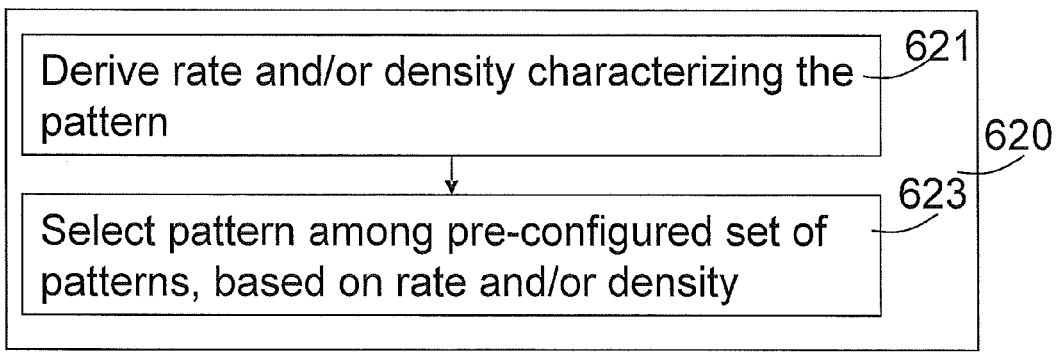

FIGS. 6b and 6c illustrate flowcharts detailing step 620 of the method in the network node according to embodiments. Step 620 comprises determining the pattern for the reduced transmission activity in the cell based on the obtained information. This step 620 may in embodiments comprise:

621: Deriving at least one of a rate and a density characterizing the pattern for the reduced transmission activity based on the obtained information. Examples of rate and density values are given in Table 1 above.

Step 620 may also comprise:

622: Generating a sequence indicating time instances of the reduced transmission activity based on a sequence length, and on the at least one of the rate and the density. Generating the sequence may comprise applying a rule using the sequence length and the at least one of the rate and the density as input parameters. Two examples of rules are given in Eq. (1) and (2) above.

In an alternative embodiment, step 620 comprises:

623: Selecting the pattern for the reduced transmission activity among a pre-configured set of patterns, based on the at least one of the rate and the density. Instead of generating a sequence, the pattern is selected from a pre-configured set of patterns.

As described above with reference to Table 2, the information relating to radio characteristics for the cell may comprise at least one of the following: a BS transmit power; UE statistics; positioning protocol packet utilization statistics; interference estimations; UE measurements related to minimizing drive tests; BS measurements; UE measurements related to mobility; UE measurements related to positioning; a radio propagation environment.

In embodiments, the obtaining of information relating to the radio characteristics for the cell in step 610 comprises obtaining, in addition to the information relating to radio characteristics for the cell, information relating to at least one of the following: system configuration information; a BS power class; a cell type; a cell range; positioning reference signal configuration information; measurement configuration information; information related to heterogeneous network aspects; patterns for reduced transmission activity in neighbour cells.

As described previously, the network node may in embodiments be a node responsible for coordination within a certain area and/or over a certain subset of BS, or it may be a BS.

Figure 6D:
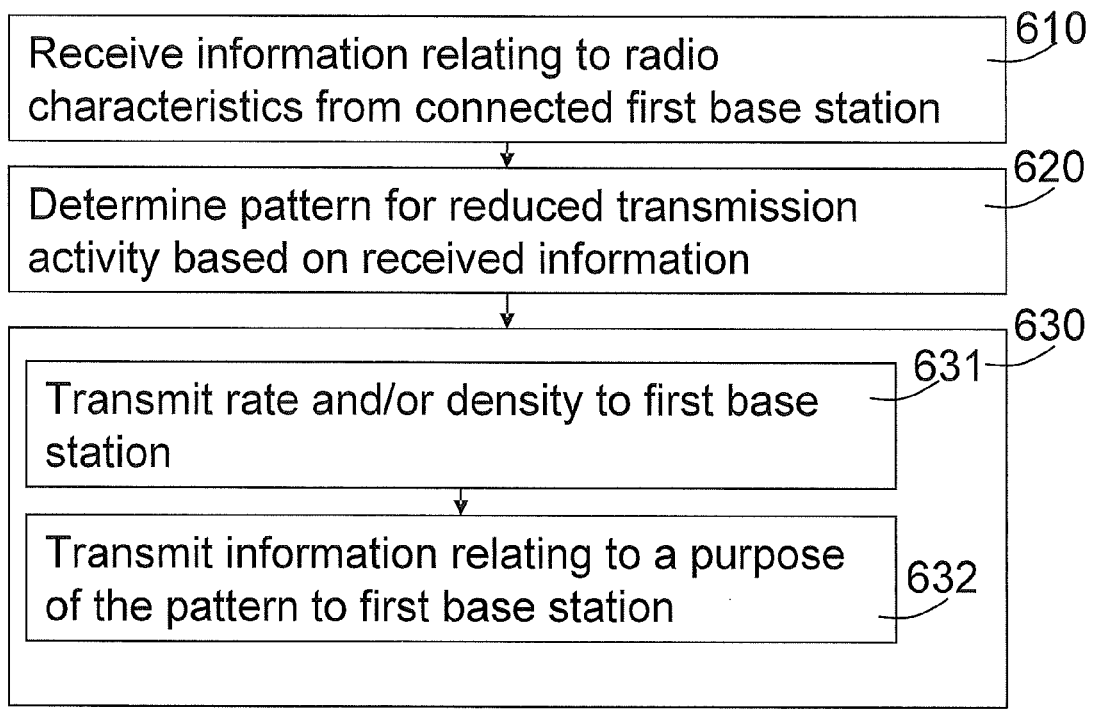

In a first embodiment, illustrated in the flowchart in FIG. 6d, the network node is a coordinating node connected to a first BS serving the cell. The coordinating node may e.g. be an RNC in UTRAN, or an MME in E-UTRAN. Obtaining 610 the information comprises receiving the information from the first BS. Obtaining 610 the information may additionally comprise receiving further information also from a further BS to which the coordinating node is connected. In this embodiment, applying 630 the determined pattern for the reduced transmission activity may comprise transmitting information describing the determined pattern to the first BS. As described above, a bit string or sequence describing the pattern may e.g. be transmitted. When the first BS receives the information describing the pattern, the BS may apply the pattern to its transmission of e.g. PRSs at the positioning occasions. When determining 620 comprises deriving 621 at least one of a rate and a density characterizing the pattern for the reduced transmission activity (see FIG. 6b-c), applying 630 the determined pattern for the reduced transmission activity may comprise transmitting 631 the at least one of the rate and the density to the first BS. This is done for enabling the first BS to generate the pattern for the reduced transmission activity based on the at least one of the rate and the density. In any of these embodiments, applying 630 the determined pattern for the reduced transmission activity may further comprise transmitting 632 information relating to a purpose of the pattern for the reduced transmission activity to the first BS.

In a second alternative embodiment, the network node is a BS serving the cell. Obtaining 610 the information comprises at least one of the following: retrieving the information in the BS serving the cell; retrieving the information from a neighbouring BS; or autonomously detecting the information. In the second embodiment, applying 630 the determined pattern for the reduced transmission activity also comprises transmitting information describing the determined pattern to a UE in the cell. Applying 630 the determined pattern for the reduced transmission activity may further comprise transmitting information relating to the purpose of the pattern for the reduced transmission activity to the UE in the cell.

According to the second embodiment, the pattern for the reduced transmission activity may be a pattern for positioning reference signal muting. Applying 630 the determined pattern may then also comprise transmitting information describing the pattern for the positioning reference signal muting to a positioning node. The BS will thus not only apply the muting pattern for the PRS transmission, but it will also transmit information describing the pattern to the positioning node, such as the E-SMLC. The E-SMLC may then inform the UEs about the muting pattern e.g. in the assistance data.

As described above, a reduced transmission activity pattern may relate to a pattern with more than two levels of the reduced transmission activity. For any of the embodiments described above, the pattern for the reduced transmission activity may be a multi-level pattern.

As an alternative to the PRS muting pattern, the pattern for the reduced transmission activity may be associated with a pattern for almost blank sub frames. The pattern for almost blank sub frames is used for enabling interference coordination in a heterogeneous network.

Figure 7A:
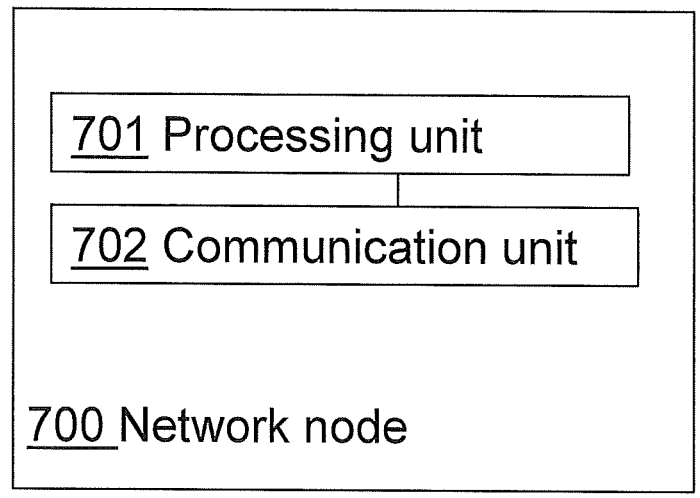
FIGS. 7a-7b are block diagrams illustrating the network node according to embodiments.

A network node 700 for a wireless communications system is schematically illustrated in the block diagram in FIG. 7a, according to embodiments. The network node is adapted to configure a pattern for a reduced transmission activity. The pattern is used for improving UE signal reception quality. The network node comprises a processing unit 701 configured to obtain information relating to radio characteristics for a cell, determine the pattern for the reduced transmission activity in the cell based on the obtained information, and apply the determined pattern for the reduced transmission activity. The network node 700 also comprises a communication unit 702 for communicating with other network nodes or UEs.

The information relating to radio characteristics for the cell may comprise at least one of the following: a BS transmit power; UE statistics; positioning protocol packet utilization statistics; interference estimations; UE measurements related to minimizing drive tests; BS measurements; UE measurements related to mobility; UE measurements related to positioning; a radio propagation environment. Furthermore, the processing unit 701 may be configured to obtain, in addition to the information relating to radio characteristics for the cell, information relating to at least one of the following: system configuration information; a BS power class; a cell type; a cell range; positioning reference signal configuration information; measurement configuration information; information related to heterogeneous network aspects; patterns for reduced transmission activity in neighbor cells The processing unit 701 may be configured to determine the pattern for the reduced transmission activity by deriving at least one of a rate and a density characterizing the pattern for the reduced transmission activity based on the obtained information. The processing unit 701 may also be configured to determine the pattern for the reduced transmission activity by further generating a sequence indicating time instances of the reduced transmission activity based on a sequence length, and on the at least one of the rate and the density. In one embodiment the processing unit 701 is configured to generate the sequence for the reduced transmission activity by applying a rule using the sequence length and the at least one of the rate and the density as input parameters.

As an alternative embodiment to determining the pattern for the reduced transmission activity by generating a sequence, the processing unit 701 may be configured to determine the pattern for the reduced transmission activity by further selecting the pattern for the reduced transmission activity among a pre-configured set of patterns, based on the at least one of the rate and the density.

According to the first embodiment described above, the network node may be a coordinating node, such as an MME 130, connectable to a first BS 110a serving the cell. The processing unit 701 is then configured to obtain the information by receiving the information from the first BS 110a. The communication unit 702 may be used for the communication with the BS 110a. Additionally, the processing unit 701 may be configured to obtain the information by receiving further information also from a further BS 110b to which the coordinating node 130 is connectable. Also here, the communication unit 702 may be used for the communication with the further BS 110b. In the first embodiment, the processing unit 701 may be configured to apply the determined pattern for the reduced transmission activity by transmitting information describing the determined pattern to the first BS 110a, e.g. via the communication unit 702. Alternatively, if the processing unit 701 is configured to determine the pattern for the reduced transmission activity by deriving at least one of a rate and a density characterizing the pattern for the reduced transmission activity, the processing unit 701 may also be configured to apply the determined pattern for the reduced transmission activity by transmitting the at least one of the rate and the density to the first BS 110a, e.g. via the communication unit 702. This is done for enabling the first BS to generate the pattern for the reduced transmission activity based on the at least one of the rate and the density.

The processing unit 701 may in the first embodiment be configured to apply the determined pattern for the reduced transmission activity by further transmitting information relating to a purpose of the pattern for the reduced transmission activity to the first BS 110a, e.g. via the communication unit 702.

According to the second embodiment described above, the network node is a BS 110a serving the cell. The processing unit 701 may then be configured to obtain the information by retrieving the information in the BS serving the cell, by retrieving the information from a neighbouring BS, and/or by autonomously detecting the information. In the second embodiment, the processing unit 701 may be configured to apply the determined pattern for the reduced transmission activity by also transmitting information describing the determined pattern to a UE in the cell, e.g. via the communication unit 702. Furthermore, the processing unit 701 may be configured to apply the determined pattern for the reduced transmission activity by further transmitting information relating to the purpose of the pattern for the reduced transmission activity to the UE in the cell.

In one embodiment, the pattern for the reduced transmission activity is a pattern for positioning reference signal muting. The processing unit 701 is in this embodiment configured to apply the determined pattern by also transmitting information describing the pattern for the positioning reference signal muting to a positioning node, such as an E-SMLC 140, e.g. via the communication unit 702.

In any embodiment described above, the pattern for the reduced transmission activity may be a multi-level pattern.

As an alternative to the PRS muting pattern, the pattern for the reduced transmission activity may be associated with a pattern for almost blank sub frames. The pattern for almost blank sub frames is used for enabling interference coordination in a heterogeneous network.

The units described above with reference to FIG. 7a may be logical units and/or physical units.

Figure 7B:
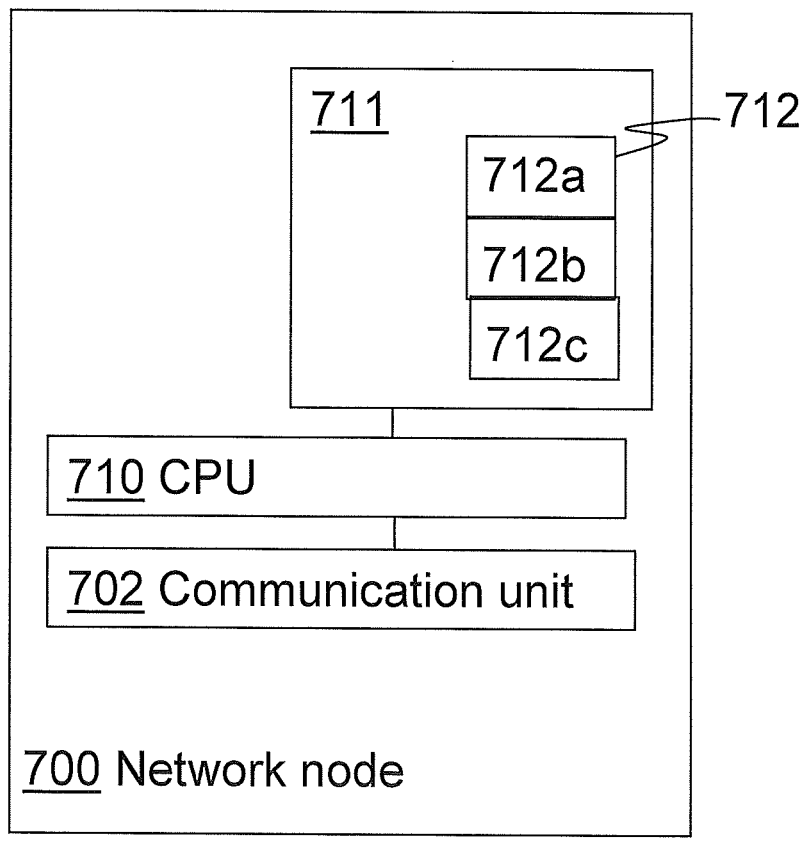

FIG. 7b schematically illustrates an embodiment of the network node 700, which is an alternative way of disclosing the embodiment illustrated in FIG. 7a. The network node 700 comprises a communication unit 702, as already described above with reference to FIG. 7a. The network node 700 also comprises a Central Processing Unit (CPU) 710 which may be a single unit or a plurality of units. Furthermore, the network node 700 comprises at least one computer program product 711 in the form of a non-volatile memory, e.g. an Electrically Erasable Programmable Read-Only Memory (EEPROM), a flash memory or a disk drive. The computer program product 711 comprises a computer program 712, which comprises code means which when run on the network node 700 causes the CPU 710 on the network node 700 to perform steps of the procedure described earlier in conjunction with FIG. 6a.

Hence in the embodiment described, the code means in the computer program 712 of the network node 700 comprises a module 712a for obtaining information relating to radio characteristics, module 712b for determining a pattern for reduced transmission activity based on the obtained information, and module 712c for applying the determined pattern. The code means may thus be implemented as computer program code structured in computer program modules. The modules 712a-c essentially perform the steps 610-630 of the flow in FIG. 6a to emulate the network node described in FIG. 7a. In other words, when the modules 712a-c are run on the CPU 710, they correspond to the processing unit 701 of FIG. 7a.

Although the code means in the embodiment disclosed above in conjunction with FIG. 7b are implemented as computer program modules, which when run on the CPU 710 causes the network node to perform the steps described above in conjunction with FIG. 6a, one or more of the code means may in alternative embodiments be implemented at least partly as hardware circuits.

The above mentioned and described embodiments are only given as examples and should not be limiting. Other solutions, uses, objectives, and functions within the scope of the accompanying patent claims may be possible.

ABBREVIATIONS

3GPP 3$^{rd}$ Generation Partnership Project
A-GPS Assisted GPS
ASIC Application Specific Integrated Circuit
BCCH Broadcast Control Channel
BS Base Station
CPU Central Processing Unit
CRS Cell-specific Reference Signal
DRX Discontinuous Reception
EEPROM Electrically Erasable Programmable Read-Only Memory
eNodeB evolved Node B
E-SMLC Evolved Serving Mobile Location Center
E-UTRAN Evolved Universal Terrestrial Radio Access Network
FDD Frequency Division Duplex
GPS Global Positioning System
LPP LTE Positioning Protocol
LPPa LPP Annex
LTE Long-Term Evolution
MBSFN Multicast Broadcast Single Frequency Network
MME Mobility Management Entity
O&M Operation and Maintenance
OTDOA Observed Time Difference Of Arrival
PRS Positioning Reference Signal
QCI Quality of Service Class Identifier
RNC Radio Network Controller
RRC Radio Resource Control
RS Reference Signal
RSRP Reference Signal Received Power
RSRQ Reference Signal Received Quality
RSTD Reference Signal Time Difference
SINR Signal-to-Interference Ratio
SLP SUPL Platform
SUPL Secure User Plane Location
TDD Time Division Duplex
UE User Equipment
UMTS Universal Mobile Telecommunication System

The invention claimed is:

1. A method in a network node of a wireless communication system for configuring a pattern for a reduced transmission activity, the pattern being used for improving user equipment signal reception quality, the method comprising:
   obtaining information relating to radio characteristics for a cell of the wireless communication system;
   determining the pattern for the reduced transmission activity in the cell based on information obtained, wherein the pattern is a set of rules regulating transmissions of signals from a node,
   wherein determining the pattern for the reduced transmission activity includes deriving at least one of a rate and a density characterizing the pattern for the reduced transmission activity based on the obtained information and generating a sequence indicating time instances of the reduced transmission activity based on a sequence length and on the at least one of the rate and the density; and
   applying the pattern determined for the reduced transmission activity.

2. The method of claim 1, wherein generating the sequence includes applying a rule using the sequence length and the at least one of the rate and the density as input parameters.

3. The method of claim 1, wherein determining the pattern for the reduced transmission activity further includes selecting the pattern for the reduced transmission activity from a pre-configured set of patterns based on the at least one of the rate and the density.

4. The method of claim 1, wherein the information relating to radio characteristics for the cell includes at least one of: a base station transmit power, user equipment statistics, positioning protocol packet utilization statistics, interference estimations, user equipment measurements related to minimizing drive tests, base station measurements, user equipment measurements related to mobility, user equipment measurements related to positioning, and a radio propagation environment.

5. The method of claim 1, wherein obtaining information relating to the radio characteristics for the cell includes obtaining information relating to at least one of: system configuration information, a base station power class, a cell type, a cell range, a positioning reference signal configuration information, a measurement configuration information, information related to heterogeneous network aspects, and patterns for reduced transmission activity in neighbor cells.

6. A method in a network node of a wireless communication system for configuring a pattern for a reduced transmission activity, the pattern being used for improving user equipment signal reception quality, the method comprising:

obtaining information relating to radio characteristics for a cell of the wireless communication system;

determining the pattern for the reduced transmission activity in the cell based on information obtained, wherein the pattern is a set of rules regulating transmissions of signals from a node; and applying the pattern determined for the reduced transmission activity, wherein the network node is a coordinating node connected to a first base station serving the cell, and obtaining the information includes receiving the information from the first base station, and wherein applying the determined pattern for the reduced transmission activity includes transmitting information describing the determined pattern to the first base station.

7. The method of claim 6, wherein obtaining the information includes receiving further information from a further base station to which the coordinating node is connected.

8. The method of claim 6, wherein determining the pattern for the reduced transmission activity includes deriving at least one of a rate and a density characterizing the pattern for the reduced transmission activity based on the obtained information; and applying the determined pattern for the reduced transmission activity includes transmitting the at least one of the rate and the density to the first base station for enabling the first base station to generate the pattern for the reduced transmission activity based on the at least one of the rate and the density.

9. The method of claim 6, wherein applying the determined pattern for the reduced transmission activity further includes transmitting information relating to a purpose of the pattern for the reduced transmission activity to the first base station.

10. A method in a network node of a wireless communication system for configuring a pattern for a reduced transmission activity, the pattern being used for improving user equipment signal reception quality, the method comprising:

obtaining information relating to radio characteristics for a cell of the wireless communication system;

determining the pattern for the reduced transmission activity in the cell based on information obtained, wherein the pattern is a set of rules regulating transmissions of signals from a node; and applying the pattern determined for the reduced transmission activity, wherein the network node is a base station serving the cell, and obtaining the information includes at least one of: retrieving the information in the base station; retrieving the information from a neighboring base station; and autonomously detecting the information, and wherein applying the determined pattern for the reduced transmission activity includes transmitting information describing the determined pattern to a user equipment in the cell.

11. The method of claim 10, wherein applying the determined pattern for the reduced transmission activity further includes transmitting information relating to the purpose of the pattern for the reduced transmission activity to the user equipment in the cell.

12. A method in a network node of a wireless communication system for configuring a pattern for a reduced transmission activity, the pattern being used for improving user equipment signal reception quality, the method comprising:

obtaining information relating to radio characteristics for a cell of the wireless communication system;

determining the pattern for the reduced transmission activity in the cell based on information obtained, wherein the pattern is a set of rules regulating transmissions of signals from a node; and applying the pattern determined for the reduced transmission activity, wherein the network node is a base station serving the cell, and obtaining the information includes at least one of: retrieving the information in the base station; retrieving the information from a neighboring base station; and autonomously detecting the information, and wherein the pattern for the reduced transmission activity is a pattern for positioning reference signal muting, and applying the determined pattern includes transmitting information describing the pattern for the positioning reference signal muting to a positioning node.

13. The method of claim 1, wherein the pattern for the reduced transmission activity is a multi-level pattern.

14. The method of claim 1, wherein the pattern for the reduced transmission activity is associated with a pattern for almost blank sub-frames for enabling interference coordination in a heterogeneous network.

\* \* \* \* \*